US011436661B2

(12) United States Patent
Geraci et al.

(10) Patent No.: US 11,436,661 B2
(45) Date of Patent: Sep. 6, 2022

(54) ELECTRONIC DEVICE FOR PROVIDING INFORMATION IN RESPONSE TO QUERY AND METHOD THEREFOR

(71) Applicant: Samsung Electronics Co., Ltd., Suwon-si (KR)

(72) Inventors: James Russell Geraci, Suwon-si (KR); Neil Hurley, Belfield (IE); Ilias Tragos, Belfield (IE); Barry Smyth, Belfield (IE); Aonghus Lawlor, Belfield (IE)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 16/566,267

(22) Filed: Sep. 10, 2019

(65) Prior Publication Data
US 2020/0364770 A1    Nov. 19, 2020

(30) Foreign Application Priority Data

May 14, 2019  (KR) .......................... 10-2019-0056585

(51) Int. Cl.
G06Q 30/00       (2012.01)
G06Q 30/06       (2012.01)

(52) U.S. Cl.
CPC ..... *G06Q 30/0633* (2013.01); *G06Q 30/0631* (2013.01)

(58) Field of Classification Search
CPC . G06Q 30/0633; G06Q 30/0631; G06F 17/10
USPC ......................................................... 705/26.8
See application file for complete search history.

(56) References Cited

U.S. PATENT DOCUMENTS

| 7,328,216 | B2 * | 2/2008 | Hofmann ............... G06F 16/335 |
| 8,676,736 | B2 * | 3/2014 | Pilaszy .................. G06F 16/951 |
| | | | 706/46 |
| 9,477,757 | B1 * | 10/2016 | Ning ...................... G06F 16/951 |
| 10,387,115 | B2 * | 8/2019 | Lifar .................... G06F 16/9038 |
| 10,963,738 | B2 * | 3/2021 | Geraci ................. G06N 3/0454 |
| 2003/0105682 | A1 | 6/2003 | Dicker et al. |
| 2012/0290518 | A1 | 11/2012 | Flinn et al. |
| 2016/0063393 | A1 * | 3/2016 | Ramage .................. H04L 67/42 |
| | | | 706/12 |

(Continued)

OTHER PUBLICATIONS

Linden, Greg, Brent Smith, and Jeremy York. "Amazon. com recommendations: Item-to-item collaborative filtering." IEEE Internet computing 7.1 (2003): 76-80.*

*Primary Examiner* — Kathleen Palavecino
(74) *Attorney, Agent, or Firm* — Jefferson IP Law, LLP

(57) ABSTRACT

An electronic device is provided. The device includes a processor configured to receive, from a first external device, a list of a first number of items generated based on a request of a user, and a first score of each of the first number of items, identify a first relevancy between each element of a first feature set and each of the first number of items and a second relevancy between each element of the set and the user, identify a first list of a second number of items, identify, for at least one item of the first list, a third relevancy between a first feature of the set which satisfies a condition and the at least one item and a fourth relevancy between the first feature and the user, based on the first relevancy and the second relevancy, and output the third relevancy and the fourth relevancy with the first list.

17 Claims, 16 Drawing Sheets

(56) References Cited

U.S. PATENT DOCUMENTS

2018/0182015 A1    6/2018  Su et al.
2018/0283723 A1*  10/2018  Ock ...................... G05B 15/02
2021/0090111 A1*   3/2021  Garg .................. G06Q 30/0631

* cited by examiner

ELECTRONIC DEVICE FOR PROVIDING INFORMATION IN RESPONSE TO QUERY AND METHOD THEREFOR

CROSS-REFERENCE TO RELATED APPLICATION(S)

This application is based on and claims priority under 35 U.S.C. 119(a) of a Korean patent application number 10-2019-0056585, filed on May 14, 2019, in the Korean Intellectual Property Office, the disclosure of which is incorporated by reference herein in its entirety.

BACKGROUND

1. Field

The disclosure relates to an electronic device for providing information in response to a query and a method for providing information in response to a query. More particularly, the disclosure relates to an electronic device for providing information in response to a query that requires a list of recommended items and a method for providing information in response to a query that requires a list of recommended items.

2. Description of Related Art

As consumer markets and technologies have developed, people are choosing from among an increasingly wide selection range. In particular, the recent trend in which the tastes of people have become personalized and diversified has increased the range of selection. In everyday life, selection is required more often, and as the number of choices becomes larger, the stress of selection becomes higher.

In order to alleviate the stress of selection, various recommendation systems have been provided. In response to a query, the recommendation system outputs, among a plurality of items, a list of one or more items. For example, the recommendation system obtains a recommendation score for each item, among a plurality of items, and outputs a predetermined number of items arranged in the sequence of higher recommendation scores.

The above information is presented as background information only to assist with an understanding of the disclosure. No determination has been made, and no assertion is made, as to whether any of the above might be applicable as prior art with regard to the disclosure.

SUMMARY

To provide information in response to a query, many methods have been suggested aiming at outputting results that accurately reflect the requirements of users. In order to output an item list that accurately reflects the requirements of a user, complex calculations are required in a process of determining a list of items to be output. Accordingly, in a method that provides information in response to a query, a list of items may be output as a response to the query but an explanation as to why the items have been output is not provided. Even when the recommendation scores for items are provided in addition to the list of items in response to the query, the user will not know why the calculated recommendation score for a specific item is higher than that for other items.

Aspects of the disclosure are to address at least the above-mentioned problems and/or disadvantages and to provide at least the advantages described below. Accordingly, an aspect of the disclosure is to provide an electronic device and a method performed by the electronic device in which the electronic device may receive a list of items recommended by an external electronic device and recommendation scores corresponding to the items and may provide an explanation of the reason why the items in the list are recommended.

Additional aspects will be set forth in part in the description which follows and, in part, will be apparent from the description, or may be learned by practice of the presented embodiments.

In accordance with an aspect of the disclosure, an electronic device is provided. The electronic device includes a communication module and at least one processor configured to receive, from a first external electronic device through the communication module, a list of a first number of items generated based on a request of a user and a first score corresponding to each item among the first number of items, identify, based at least on the list of the first number of items and the first score, a first relevancy between each element of a predetermined first feature set and each item among the first number of items and a second relevancy between each element of the first feature set and the user, identify a first list of a predetermined second number of items, the second number being smaller than the first number, identify, for at least one first item among the items of the first list, a third relevancy between at least one first feature among the elements of the first feature set which satisfies a designated condition and the at least one first item and a fourth relevancy between the at least one first feature and the user, based on the first relevancy and the second relevancy, and output the third relevancy and the fourth relevancy, together with the first list, where the first list is a list of the second number of items having highest first scores among the first number of items.

In accordance with an aspect of the disclosure, a method of an electronic device is provided. The method includes receiving from a first external electronic device a list of a first number of items generated based on a request of a user and a first score corresponding to each item among the first number of items, identifying a first relevancy between each element of a predetermined first feature set and each item among the first number of items and a second relevancy between each element of the first feature set and the user, based at least one the list of the first number of items and the first score, identifying a first list of a predetermined second number of items, the second number being smaller than the first number, identifying, for at least one first item among the items of the first list, a third relevancy between at least one first feature among the elements of the first feature set which satisfies a designated condition and the at least one first item and a fourth relevancy between the at least one first feature and the user, based on the first relevancy and the second relevancy, and outputting the third relevancy and the fourth relevancy, together with the first list, where the first list is a list of the second number of items having highest first scores among the first number of items.

In accordance with another aspect of the disclosure, an electronic device is provided. The electronic device includes a communication module and at least one processor, the at least one processor configured to transmit a query to a first external electronic device through the communication module, receive a list of items corresponding to the query from the first electronic device through the communication module, identify at least one element among elements of a feature set associated with the items and a first relevancy between the at least one element and each of the items, identify a second relevancy between the at least one element and a user associated with the query, and provide, together with at least some of the items, a reason for recommendation based on the first relevancies, the second relevancy, and the at least one element.

In accordance with another aspect of the disclosure, an electronic device for providing information in response to a query and a method for providing information in response to a query are provided. Accordingly, the user may be provided with an explanation on why recommended items as well as a list of the recommended items and the recommendation scores for the items are recommended in response to a query. In particular, the electronic device and the method according to various embodiments, since the reason why the items are recommended is inferred by receiving the list of the items and the recommendation scores that are the results of the selection of the recommend items performed by the external electronic device, a recommendation result of the external electronic device including an arbitrary recommendation system can be explained. Accordingly, the rights to know of the users who use the item recommendation service can be expanded.

Further, since the electronic device for providing information in response to a query and the method for providing information in response to a query according to various embodiments can be independently operated from the recommendation algorithm, the electronic device can easily manage the recommendation algorithm after separating the recommendation algorithm.

Further, according to various embodiments, since the user is provided with an explanation on why the recommendation item is recommended, the user can recognize the reason why an item is recommended when the item is not suitable for a requirement of the user. Accordingly, the user can be provided with direct feedback on a parameter related to the reason why the corresponding item is recommended such that the item that is not suitable for the requirement of the user is no longer recommended. As a result, the user can be provided with a recommendation that agrees with the requirement of the user better by providing feedback.

Further, according to various embodiments, the diversity of the recommendation results can be increased since an item feature model is used. In particular, when the user provides feedback on the parameter related to the reason why the item is recommended, both effects of enhancement of the diversity of the recommendation result and provision of an explanation can be shown.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 10A, 10B, 10C, and 10D illustrate histograms depicting operation results of an electronic device according to various embodiments of the;

FIGS. 11A, 11B, 11C, and 11D illustrate histograms depicting operation results of an electronic device according to various embodiments of the.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
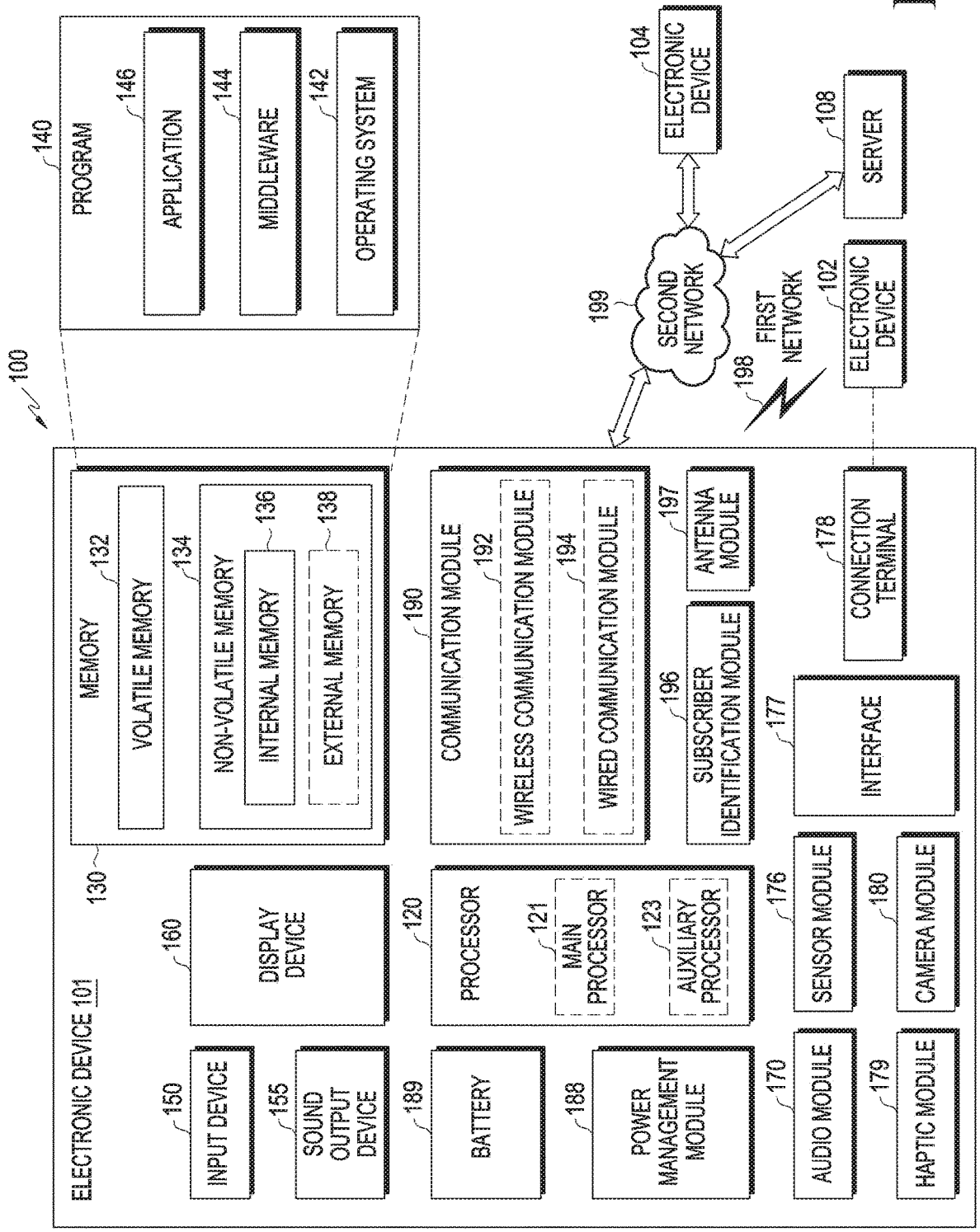
FIG. 1 illustrates a block diagram of an electronic device in a network environment according to various embodiments of the disclosure.

FIG. 1 is a block diagram of an electronic device 101 in a network environment 100 according to various embodiments of the disclosure.

Referring to FIG. 1, in a network environment 100, an electronic device 101 may communicate with an electronic device 102 through a first network 198 (e.g., a near field wireless communication network), or may communicate with an electronic device 104 or a server 108 through a second network 199 (e.g., a long distance wireless communication network). According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the elements may be omitted from the electronic device 101 or one or more elements may be added thereto. In some embodiments, some of the elements may be implemented with one integrated circuit. For example, the sensor module 176 (e.g., a fingerprint sensor, an iris sensor, or an illumination sensor) may be implemented while being embedded in the display device 160 (e.g., a display).

The processor 120, for example, may control at least one element (e.g., a hardware or software element) of the electronic device 101 connected to the processor 120 by executing software (e.g., a program 140), and may perform various data processing or calculations. According to an embodiment, as at least a part of data processing or calculations, the processor 120 may load a command or data received from another element (e.g., the sensor module 176 or the communication module 190) in a volatile memory 132, may process a command or data stored in the volatile memory 132, and may store resultant data in the nonvolatile memory 134. According to an embodiment, the processor 120 may include a main processor 121 (e.g., a central processing device or an application processor), and an auxiliary processor 123 (e.g., a graphic processing device, an image signal processor, a sensor hub processor, or a communication processor) that may be operated independently from or together with the main processor 121. Additionally or alternatively, the auxiliary processor 123 may use lower power than the main processor 121, or may be set to be specific to a designated function. The auxiliary processor 123 may be implemented separately from or as part of the main processor 121.

The auxiliary processor 123, for example, may control at least some of functions or states related to at least one element (e.g., the display device 160, the sensor module 176, or the communication module 190) of the elements of the electronic device 101 in place of the main processor 121 while the main processor 121 is in an inactive (e.g., sleep) state, or together with the main processor 121 while the main processor 121 is in an active (e.g., application execution) state. According to an embodiment, the auxiliary processor 123 (e.g., an image signal processor or a communication processor) may be implemented as a part of another element (e.g., the camera module 180 or the communication module 190) which is functionally relevant.

The memory 130 may store various data used by at least one element (e.g., the processor 120 or the sensor module 176) of the electronic device 101. The data, for example, may include software (e.g., a program 140), and input data or output data for a related command. The memory 130 may include a volatile memory 132 or a nonvolatile memory 134.

The program 140 may be stored in the memory 130 as software, and for example, may include an operating system 142, middleware 144, or an application 146.

The input device 150 may receive a command or data, which will be used in an element (e.g., the processor 120) of the electronic device 101 from the outside (e.g., the user) of the electronic device 101. The input device 150, for example, may include a microphone, a mouse, a keyboard, or a digital pen (e.g., a stylus pen).

The sound output device 155 may output a sound signal to the outside of the electronic device 101. The sound output device 155, for example, may include a speaker or a receiver. The speaker may be used for a general purpose, such as playback of multimedia or recording/reproduction, and the receiver may be used to receive a terminating line phone. According to an embodiment, the receiver may be implemented separately from the speaker or as a part thereof.

The display device 160 may visually provide information to the outside (e.g., the user) of the electronic device 101. The display device 160, for example, may include a display, a hologram device, or a projector, and a control circuit for controlling the corresponding device. According to an embodiment, the display device 160 may include a touch circuit configured to detect a touch, or a sensor circuit (e.g., a pressure sensor) configured to measure the strength of a force generated by the touch.

The audio module 170 may convert a sound to an electric signal or conversely convert an electric signal to a sound. According to an embodiment, the audio module 170 may acquire a sound through the input device 150 or may output a sound through the sound output device 155 or an external electronic device (e.g., the electronic device 102) (e.g., a speaker or a headphone) directly or wirelessly connected to the electronic device 101.

The sensor module 176 may detect an operation state (e.g., power or a temperature) of the electronic device 101 or a state (e.g., the user state) of an external environment, and may generate an electric signal or a data value corresponding to the detected state. According to an embodiment, the sensor module 176, for example, may include a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illumination sensor.

The interface 177 may support one or more designated protocols that may be used to connect the electronic device 101 to an external electronic device (e.g., the electronic device 102) directly or wirelessly. According to an embodiment, the interface 177, for example, may include a high definition multimedia interface (HDMI), a universal serial bus (USB) interface, an SD card interface, or an audio interface.

A connection terminal 178 may include a connector, through which the electronic device 101 may be physically connected to an external electronic device (e.g., the electronic device 102). According to an embodiment, the connection terminal 178, for example, may include an HDMI connector, a USB connector, an SD card connector, or an audio connector (e.g., a headphone connector).

The haptic module 179 may convert an electric signal to a mechanical stimulus (e.g., vibration or a motion) or an electrical stimulus that may be recognized by the user through a haptic stimulus or a sense of motion. According to an embodiment, the haptic module 179, for example, may include a motor, a piezoelectric element, or an electrical stimulus device.

The camera module 180 may capture a still image or a video. According to an embodiment, the camera module 180 may include one or more lenses, image sensors, image signal processors, or flashes.

The power management module 188 may manage power supplied to the electronic device 101. According to an embodiment, the power management module 188, for example, may be implemented as at least a part of a power management integrated circuit (PMIC).

The battery 189 may supply power to at least one element of the electronic device 101. According to an embodiment, the battery 189, for example, may include a primary cell that cannot be recharged, a secondary cell, or a fuel cell.

The communication module 190 may support the establishment of a direct (e.g., wired) communication channel or a wireless communication channel between the electronic device 101 and the external electronic device (e.g., the electronic device 102, the electronic device 104, or the server 108), and execution of communication through the established communication channel. The communication module 190 may include one or more communication processors that are operated independently from the processor 120 (e.g., an application processor) and supports direct (e.g., wired) communication or wireless communication. According to an embodiment, the communication module 190 may include a wireless communication module 192 (e.g., a cellular communication module, a near field wireless communication module, or a global navigation satellite system (GNSS) communication module) or a wired communication module 194 (e.g., a local area network (LAN) communication module or a power line communication module). Among the communication modules, the corresponding communication module may communicate with an external electronic device through the first network 198 (e.g., a near field communication network such as Bluetooth, Wi-Fi direct, or infrared data association (IrDA)) or the second network 199 (e.g., a long distance communication network such as a cellular network, the internet, or a computer network (e.g., a LAN or wide area network (WAN))). The several kinds of communication modules may be integrated into one element (e.g., a single chip) or may be implemented as a plurality of separate elements (e.g., a plurality of chips). The wireless communication module 192 may identify or verify the electronic device 101 in a communication network such as the first network 198 or the second network 199 by using subscriber information (e.g., an international mobile subscriber identifier (IMSI)) stored in the subscriber identification module 196.

The antenna module 197 may transmit a signal or power to the outside (e.g., an external electronic device) or receive a signal or power from the outside. According to an embodiment, the antenna module may include one antenna including a conductor formed on a substrate (e.g., a printed circuit board (PCB)) or a radiator with a conductive pattern. According to an embodiment, the antenna module 197 may include a plurality of antennas. In this case, at least one antenna that is suitable for a communication scheme used in a communication network such as the first network 198 or the second network 199, for example, may be selected from the plurality of antennas by the communication module 190. A signal or power may be transmitted or received between the communication module 190 and an external electronic device through the selected at least one antenna. In some embodiments, in addition to the radiator, another component (e.g., a RFIC) may be additionally formed as a part of the antenna module 197.

At least some of the elements may be connected to each other through a communication scheme (e.g., a bus, a general purpose input and output (GPIO), a serial peripheral interface (SPI), or a mobile industry processor interface (MIPI)) between peripheral devices, and may exchange signals (e.g., a command or data).

According to an embodiment, a command or data may be transmitted or received between the electronic device 101 and the external electronic device 104 through the server 108 connected to the second network 199. The electronic device 102 or 104 may be a device that is the same as or different from the electronic device 101. According to an embodiment, all or some of the operations executed by the electronic device 101 may be executed by one or more external devices among the external electronic devices 102, 104, or 108. For example, when the electronic device 101 has to perform some functions or services automatically or in response to a request from the user or another device, the electronic device 101 may request one or more external electronic devices to perform at least some of the functions or services in place of self-execution of the functions or services or additionally. One or more external electronic devices that received the request executes at least some of the requested functions or services or an additional function or service related to the request, and may deliver the execution result to the electronic device 101. The electronic device 101 may process the result as it is or additionally to provide the processed result as at least a part of a response to the request. To achieve this, for example, the cloud computing, distributed computing, or client-server computing technologies may be used.

Figure 2A:
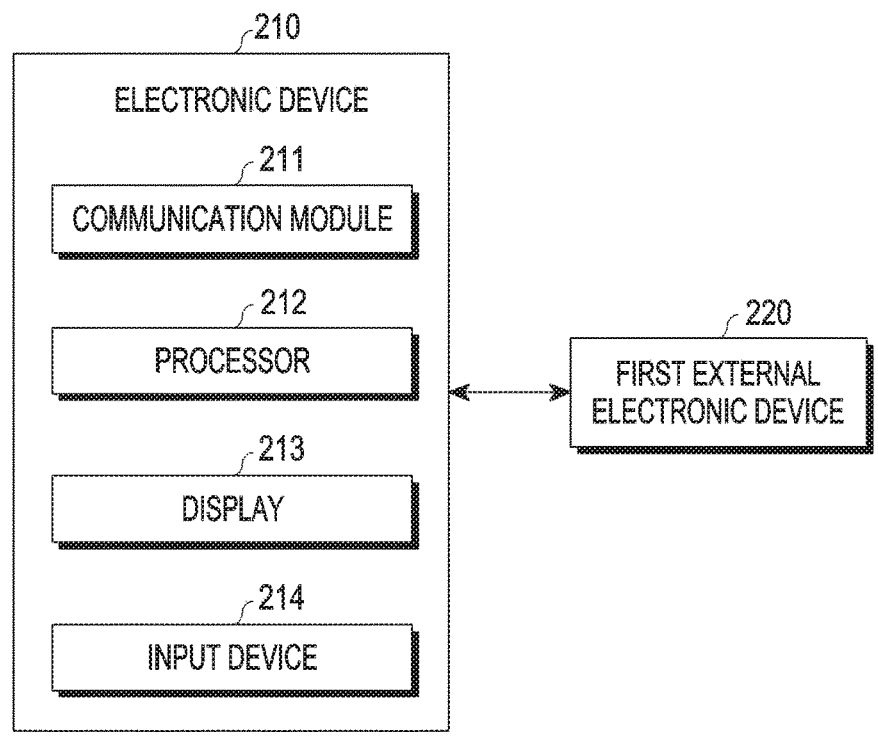
FIG. 2A illustrates a block diagram of an electronic device according to various embodiments of the disclosure.

FIG. 2A illustrates a block diagram of an electronic device according to various embodiments of the disclosure. According to various embodiments, the electronic device 210 may include a communication module 211, a processor 212, a display 213, and an input device 214. The electronic device 210, for example, may include at least some of the elements of the electronic device 101. The processor 212 of the electronic device 210 may identify a request of a user for a list of recommended items, through the input device 214. The processor 212 may transmit a request of the user to a first external electronic device 220 through the communication module 211, and may receive a list of a first number of recommended items identified by the first external electronic device 220 and a recommendation score for each of the items included in the list from the first external electronic device 220 through the communication module 211. The processor 212 may identify, based on a list of the first number of received recommended items and the recommendation score for each of the items included in the list, a first relevancy between each of the items included in the list and each element of a predefined feature set and a second relevancy between each element of the feature set and the user. The processor 212 may provide, based on the first relevancy and the second relevancy, an explanation of the reason why each of the items included in the list is recommended to the user through the display 213.

Since the above-described details of the electronic device 101 of FIG. 1, the communication module 190, the processor 120, the display device 160, and the input device 150 can be applied in the same way for the details of the electronic device 210, the communication module 211, the processor 212, the display 213, and the input device 214, a description thereof will not be repeated. Further, the first external electronic device 220, for example, may be the server 108 described above with reference to FIG. 1.

Figure 2B:
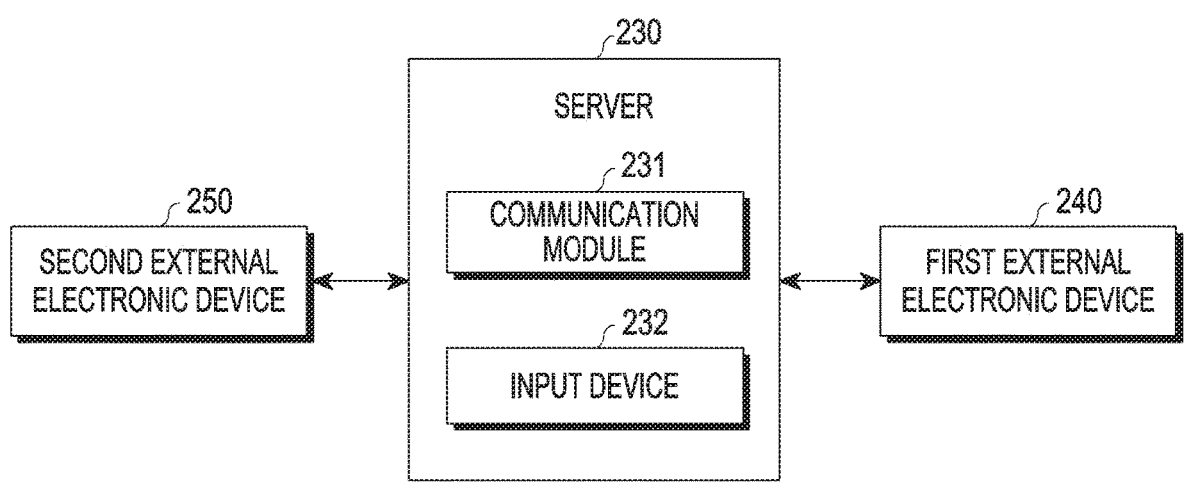
FIG. 2B illustrates a block diagram of an electronic device according to various embodiments of the disclosure.

FIG. 2B illustrates a block diagram of an electronic device according to various embodiments of the disclosure. According to various embodiments, the server 230 may include a communication module 231 and a processor 232. The processor 232 of the server 230 may receive a request of the user for a list of recommended items, from a second external electronic device 250 through the communication module 231 and may transmit the received request of the user to the first external electronic device 240 through the communication module 231. Further, the processor 232 may receive a list of a first number of recommended items identified by the first external electronic device 240 and a recommendation score for each of the items included in the list from the first external electronic device 240 through the communication module 231. The processor 232 may identify, based on a list of the first number of received recommended items and the recommendation score for each of the items included in the list, a first relevancy between each of the items included in the list and each element of a predefined feature set and a second relevancy between each of the elements of the feature set and the user. The processor 232 may identify, based on the first relevancy and the second relevancy, a third relevancy between, among elements of the first feature set, at least one first feature that satisfies a designated condition and at least one of the recommended items and a fourth relevancy between at least one first feature and the user. Thereafter, the processor 232 may transmit at least one of the recommended items, the third relevancy, and the fourth relevancy to the second external electronic device 250 through the communication module 231. The second external electronic device 250 may provide, based on the information received from the server 230, at least some of the recommended items and an explanation on the reason why the items are recommended to the user.

Since the above-described details of the electronic device 101 and the server 108 of FIG. 1 are applied in the same way for the details of the second external electronic device 250 and the server 230, a description thereof will not be repeated here.

Figure 3:
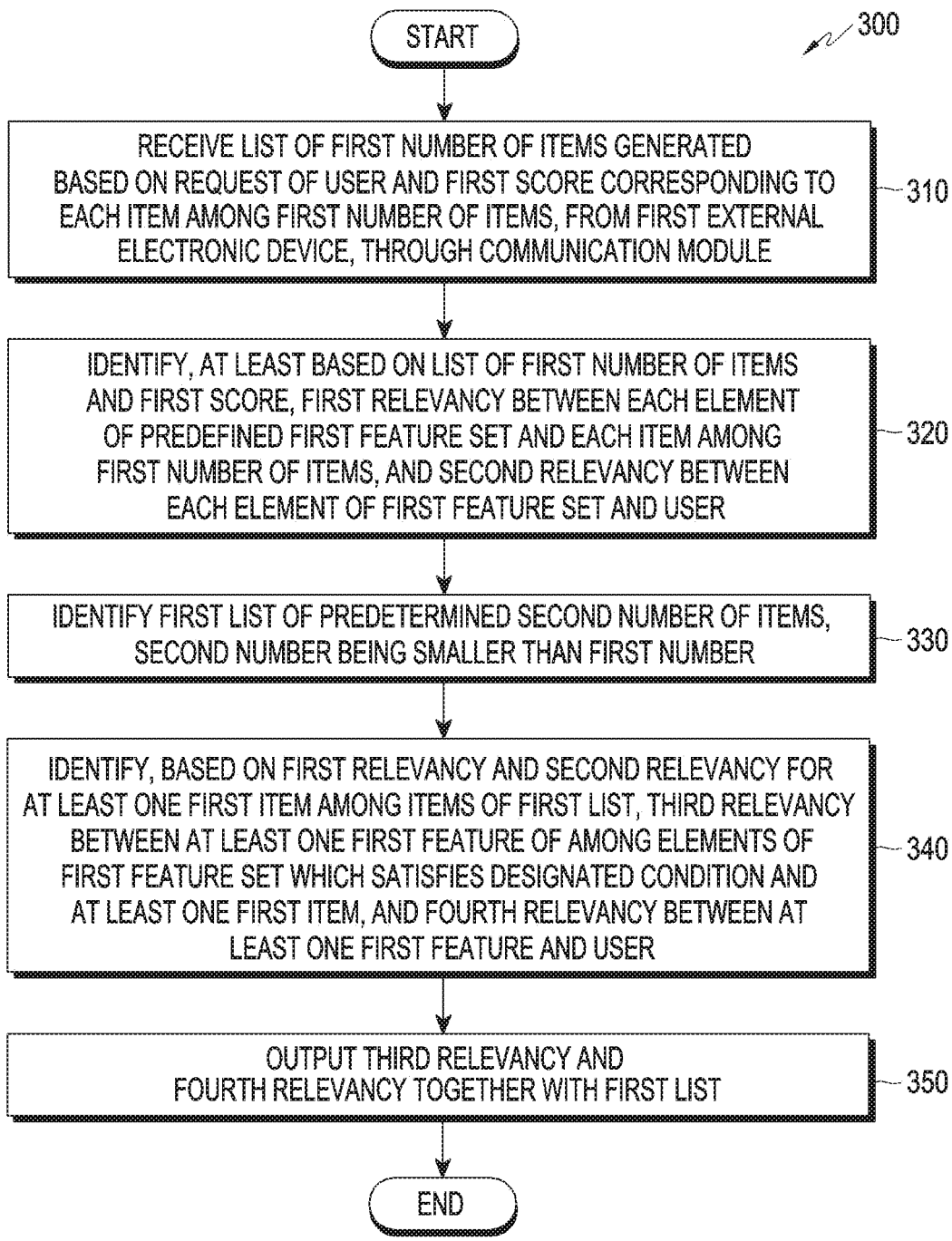
FIG. 3 illustrates a flowchart illustrating an operation of an electronic device according to various embodiments of the disclosure.

FIG. 3 illustrates a flowchart illustrating an operation 300 of an electronic device according to various embodiments of the disclosure. In operation 310, a processor (e.g., the processor 212) included in an electronic device (e.g., the electronic device 210) may receive a list of a first number of items generated based on a request of the user and a first score corresponding to each item among the first number of items, from a first external electronic device (e.g., the first external electronic device 220) through a communication module (e.g., the communication module 211). According to various embodiments, the list of the first number of items may be a list of the items recommended by the first external electronic device 220, and the first score may be a recommendation score for each item, which is calculated by the first external electronic device 220.

The electronic device mentioned in the disclosure may be the electronic device 210 described above with reference to FIG. 2A and may be the server 230 described above with reference to FIG. 2B. For convenience of description, if a mention that the electronic device is the server 230 described with reference to FIG. 2B is not made, a case in which the electronic device is the electronic device 210 described with reference to FIG. 2A will be described.

According to various embodiments, when the electronic device is the electronic device 210 described with reference to FIG. 2A, the processor 212 of the electronic device 210 may identify a request for the list of the first number of items and the first score from the user through the input device 214. The processor 212 may perform operation 310 after transmitting the request of the user to the first external electronic device 220 through the communication module 211.

According to various embodiments, when the electronic device is the server 230 described with reference to FIG. 2B, the processor 232 of the server 230 may receive a request of the user for a list of the first number of items and the first score from the second external electronic device 250 through the communication module 231, transmit the received request of the user to the first external electronic device 240 through the communication module 231, and then perform operation 310.

According to various embodiments, the first external electronic device 220 may include an arbitrary recommendation system that selects a first number of items from the items in the database in response to a request of the user and outputs a list of the first number of items and a first score corresponding to each item among the first number of items. For example, the first external electronic device 220 may include a system that recommends a movie, a book, or a product on sale.

According to various embodiments, a query may be generated and sent by a request of the user or may be generated and sent without any request of the user. For example, the user may request a list of a first number of items and a first score by selecting a graphic element, for example, a recommendation button, displayed on the display 213 of the electronic device 210. In another example, when the user accesses a specific webpage or an application state, for example, a main page of a video streaming website, the processor 212 of the electronic device 210 may transmit a query to the first external electronic device 220 without any explicit request from the user.

According to various embodiments, the query may include a request for a list of a first number item and a first score. In another example, the query may include information on a request for a list of a first number of items among recommended items and information on the types of items desired to be recommended. For example, the query may include information indicating that the user wants an item list related to books. Further, according to various embodiments, the query may include a keyword input by the user.

In operation 320, the processor 212 may identify, at least based on the list of the first number of items and the first score, a first relevancy between each element of a predefined first feature set and each item among the first number of items and a second relevancy between each element of the first feature set and the user. According to various embodiments, the first feature set may be a set of the features of the predefined items. For example, when the first number of items are movies, the first feature set may be a genre, the elements of the first feature set may include a romance movie, a horror movie, an action movie, and a sci-fi movie, and are not limited to the examples described herein. In this example, the first relevancy between the elements of the predefined first feature set and each item among the first number of items may represent a probability of each item pertaining to the genre, and the second relevancy between each of the elements of the first feature set and the user may represent a probability of the user preferring each movie genre.

In operation 330, the processor 212 may identify a first list of a predetermined second number of items, wherein the second number is smaller than the first number. According to various embodiments, the first list may be a list of, among the first number of items, a second number of items having the highest first score, and the second number may be smaller than the first number. According to various embodiments, the first list may be a list of items to be provided to the user.

In operation 340, the processor 212 may identify, for at least one first item among the items of the first list, based on the first relevancy and the second relevancy, a third relevancy between at least one first feature among the elements of the first feature set which satisfies a designated condition and the at least one first item and a fourth relevancy between the at least one first feature and the user. According to various embodiments, the at least one first item may be, among the items of the first list, an item for providing an explanation of the reason for the recommendation. According to various embodiments, the at least one first item may be all of the items of the first list or some of the items of the first list.

According to various embodiments, the designated condition for the elements of the first feature set may be a condition for identifying, among the elements of the first feature set, the elements of the feature set which will be provided as the reason for the recommendation. For example, among the elements of the first feature set, a predetermined number of elements, of which the product of the first relevancy and the second relevancy is highest, may be identified as the first feature.

In operation 350, the processor 212 may output the third relevancy and the fourth relevancy, together with the first list. According to various embodiments, when the electronic device is an electronic device 210 described above with reference to FIG. 2A, the processor 212 may output the third relevancy and the fourth relevancy by displaying the third relevancy and the fourth relevancy on the display 213 together with the first list. According to various embodiments, when the electronic device is the server 230 described with reference to FIG. 2B, the processor 232 of the server 230 may transmit the third relevancy and the fourth relevancy to the second external electronic device 250 together with the first list through the communication module 231 to output the third relevancy and the fourth relevancy.

According to various embodiments, the first list, the third relevancy, and the fourth relevancy may be displayed through illustration as will be described with reference to FIG. 5. Further, alternatively, the first list, the third relevancy, and the fourth relevancy may be displayed in the form of text. For example, a text such as "We recommend 'Star Wars' because 'Star Wars' is relevant to people who like sci-fi movies at a probability of 90% and we are certain with 80% confidence that you like sci-fi movies" may be displayed to the user. In this sentence, among the items of the first list, an explanation on 'Star Wars' is provided, the third relevancy is 90%, the fourth relevancy is 80%, and the first feature is sci-fi.

Figure 4:
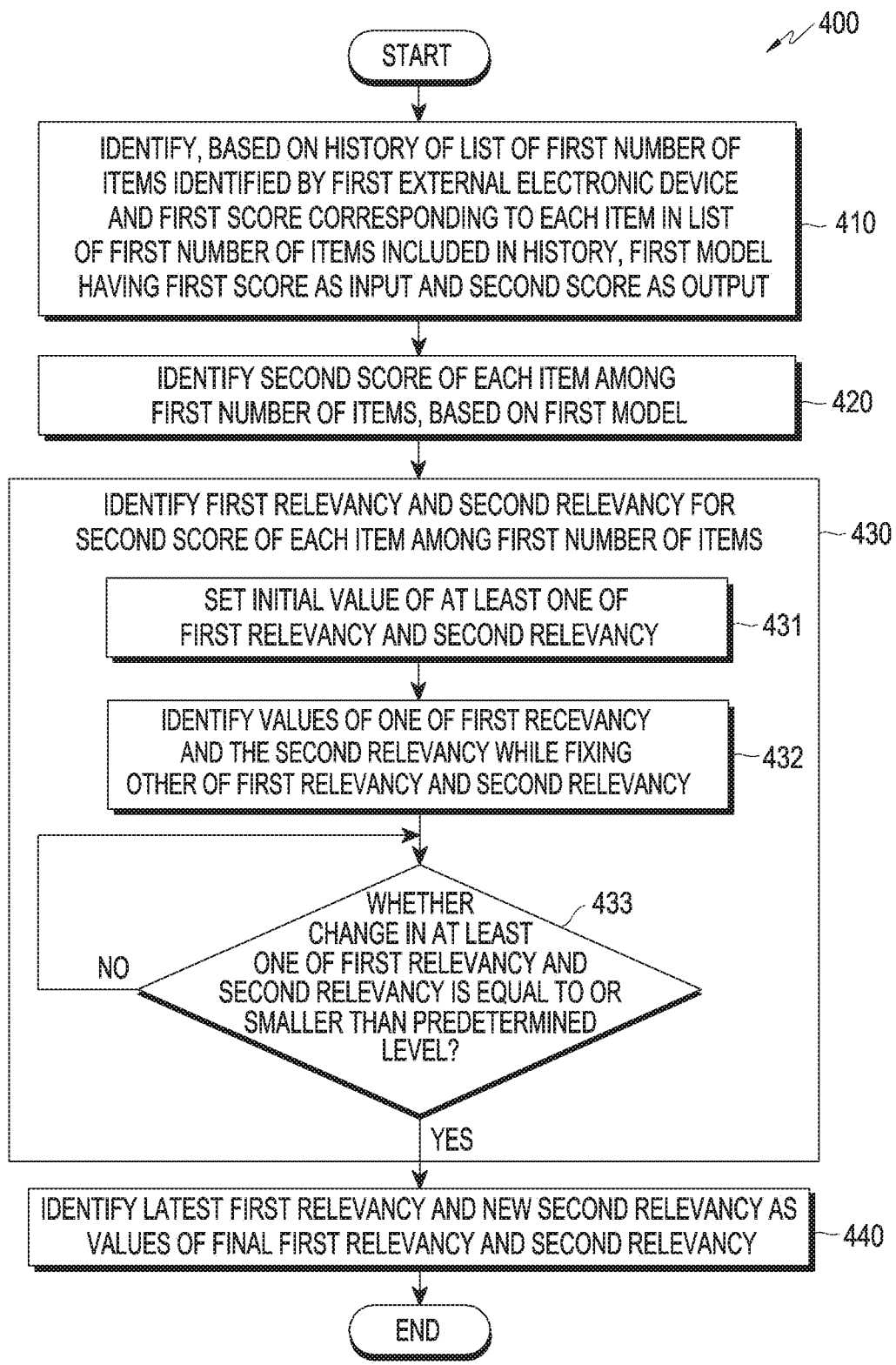
FIG. 4 illustrates a flowchart illustrating an operation of an electronic device according to various embodiments of the disclosure.

FIG. 4 illustrates a flowchart illustrating an operation 400 of an electronic device according to various embodiments of the disclosure. In detail, FIG. 4 illustrates operations for identifying the first relevancy between each of the elements of the predefined first feature set and each item among the first number of items and the second relevancy between each of the elements of the first feature set and the user which have been described with reference to 320 of FIG. 3. Although the operations of FIG. 4 will be described below in connection with the example performed by the electronic device 101 for convenience of description, the operations of FIG. 4 may be performed by the server 230 described with reference to FIG. 2B.

In operation 410, the electronic device (e.g., the processor (e.g., the processor 120) of the electronic device 101) may identify, based on a history of a list of the first number of items identified by a first external device and a first score corresponding to each item in the list of the first number of items, a first model having the first score as an input and a second score as an output. The history of the list of the first number of items and the first score corresponding to each item in the list of the first number of items may be data generated previously by the first external electronic device based on a request of a user before a runtime.

According to various embodiments, the first model may be a function that monotone increases for the first score. When the first model is a function that monotone increases for the first score, the sequence of the second scores for the first number of items is the same as the sequence of the first scores for the first number of items. For example, when the user is u, the first score for an item I may be represented by s(i|u) and the first model may have the following relationship with the first score s(i|u)

$$g(s(i|u)) = \frac{1}{1 + \exp(-b_0 - b_1 s(i|u))} \qquad \text{Equation 1}$$

In this case, the first processor 120 may identify the first model by identifying b0 and b1 based on the history of the list of the first number of items and the first score corresponding to each item in the list of the first number of items included in the history.

In operation 420, the processor 120 of the electronic device 101 may identify the second score of each item among the first number of items, based on the first model identified in operation 410. In operation 420, the first number of times may be the first number of items generated by the first external electronic device (e.g., the first external electronic device 220) based on the request of the user at runtime described with reference to operation 310 of FIG. 3. The processor 120 of the electronic device 101 may input the first score of each item among the first number of items to the first model, and may identify the output second score.

In operation 430, the processor 120 of the electronic device 101 may identify a first relevancy and a second relevancy for the second score of each item among the first number of items. According to various embodiments, since the details of the first relevancy and the second relevancy are the same as described with reference to operation 320 of FIG. 3, they will not be repeatedly described here.

According to various embodiments, a total sum of products of the first relevancies and the second relevancies for the respective elements of a predetermined first feature set may be the same value as the second score that is an output value of the first model g(s(i|u)). That is, the following relationship may be established between the second score of each item among the first number of items and the first relevancy and the second relevancy.

$$g(s) = \sum_{a \in F_1} p(rel_i|a, s) p(a|u, s) \qquad \text{Equation 2}$$

In Equation 2, g(s) is a second score of each item, $F_1$ is a first feature set, a is an element of the first feature set, $p(rel_i|a,s)$ is a first relevancy, and $p(a|u,s)$ is a second relevancy.

Hereinafter, operations 431 to 433 are detailed operations of identifying the first relevancy and the second relevancy in the processor 120 of the electronic device 101.

In operation 431, the processor 120 of the electronic device 101 may set initial values of at least one of the first relevancy or the second relevancy. According to various embodiments, a probability $p(rel_i|u)$ by which an item i is associated with the user u, may the following model.

$$p(rel_i|u) = p(rel_i|u,A) + (1-\beta)g_u(i) \quad \text{Equation 3}$$

In Equation 3, β is a value of not less than 0 to not more than 1, and means a probability by which an item aspect model $p(rel_i|u,A)$ can explain a correlation for the user u of an item i. Further, $g_u(i)$ means $g(s(i|u))$. From Equation 3, the following may be derived.

$$p(rel_i|a,u) = \frac{p(rel_i,a|u)}{p(a|u)} = \frac{p(a|rel_i,u)p(rel_i|u,A)}{p(a|u)} = \frac{p(a|rel_i)\beta g_u(i)}{p(a|u)} \quad \text{Equation 4}$$

Accordingly, the following has to be satisfied.

$$p(a|u) \geq \beta p(a|rel_i,u)g_u(i) \forall i \quad \text{Equation 5}$$

Here, $p(a|rel_i,u)$ means a probability by which a feature a is an intention of the user when the item i is associated with the user u. With the assumption that the value of $p(a|rel_i,u)$ is known temporarily, $\pi_{aiu} = p(a|rel_i,u)$ is represented for convenience of description. A method of specifying a value of $\pi_{aiu} = p(a|rel_i,u)$ will be described below.

It may be assumed that $m_a = \max_{j \in C^{\pi}_{aiu}} g(s(j|u))$ and $$m = \sum_a m_a.$$

Thereafter, initial values of $p(rel_i|a,u)$ and $p(a|u)$ may be specified for the cases of $m \leq 1$ and $m > 1$.

First, when $m \leq 1$, $$p(rel_i|a,u) = \frac{m\pi_{aiu}g_u(i)}{p(a|u)}$$

if β=m and $p(a|u) = m_a/m$.

Second, when m>1, $$p(rel_i|a,u) = \frac{\pi_{aiu}g_u(i)}{m_a}$$

if β=1/m and $p(a|u) = \beta m_a$. In both the cases, it may be identified that the following relationship is established.

$$p(rel_i|u) = p(rel_i|u,A) + (1-\beta)g_u(i) \quad \text{Equation 6}$$

$$= \beta \sum_{a \in A} \pi_{aiu}g_u(i) + (1-\beta)g_u(i)$$

$$= \beta g_u(i) + (1-\beta)g_u(i) = g_u(i)$$

Meanwhile, in order to specify a value of $\pi_{aiu} = p(a|rel_i,u)$, an aspect model that is different from the above-described item aspect model may be given. When the different aspect model is given, a value of $\pi_{aiu}$ may be identified as follows.

$$\pi_{aiu} = \frac{p_c(rel_i,a|u)}{p_c(rel_i|u)} = \frac{p_c(rel_i|a,u)p_c(a|u)}{\sum_{a'} p_c(rel_i|a',u)p_c(a'|u)} \quad \text{Equation 7}$$

In Equation 7, the subscript c is provided to represent that the probability is a probability calculated by using the aspect model that is different from the above-described item aspect model.

According to various embodiments, the aspect models of Vargas and

Castells may be used to specify the value of $\pi_{aiu}$. According to the aspect models of Vargas and Castells, $p_c(a|u)$ may be obtained as follows.

$$p_c(a|u) = \frac{|(v,i) \in T : v = u, f \in F_i|}{\sum_{f' \in F} \sum |(v,i) \in T : v = u, f' \in F_i|} \quad \text{Equation 8}$$

In Equation 8, $a \in A$ corresponds to an intention to select an item of a feature $f \in F$. In Equation 8, it may be construed that $p_c(a|u)$ is specified by obtaining a frequency at which each feature is selected from an item selection history of the user u. Further, in the aspect models of Vargas and Castells, $p_c(rel_i|a,u)$ may be identified as follows.

$$p_c(rel_i|a,u) = 1/2(2^{h(f)s(i|u)/s^*(u,f)} - 1) \quad \text{Equation 9}$$

In Equation 9, h(f) is a function that is 1 for f of $f \in F_i$ and 0 for f of $f \notin F_i$.

According to various embodiments, a value of $p_c(a|u)$ may be specified by an extended c-PLSA model. The PLSA model of Hoffman uses a latent category, whereas the c-PLSA model analyzes a probability under a restriction of $p_c(rel_i|f) \neq 0$ only when $f \in F_i$ by using an explicit category |F|. The extended c-PLSA model is for compensating for the fact that the c-PLSA model has a bad diversity of results. The bad diversity means, for example, that the number of genres identified to be associated with one item is small when the feature of the item is a movie genre.

According to various embodiments, each feature vector f is defined by $(f_1, \ldots, f_{|U|})$, and $f_u = |(u,i) \in T: f \in F_i|$, the cosine similarity between the feature vectors f and f' may be calculated as follows.

$$sim(f,f') = f^T f'/(|f||f'|) \quad \text{Equation 10}$$

If $k_F$ features that are most similar to the feature f are defined as neighbors $N_f$ of f, the features associated with the items may be extended to a set of neighbors as follows.

$$F_i^e = U_{f \in F_i} N_f \quad \text{Equation 11}$$

As $k_F$ approaches m, $F_i^e$ becomes similar to F, and the extended c-PLSA becomes identical to the PLSA of m=|F|. According to various embodiments, based on the value of $p_c(a|u)$ calculated by using the extended c-PLSA, an initial value of at least one of the first relevancy or the second relevancy may be specified.

In operation 432, the processor 120 of the electronic device 101 may identify the value of one of the first relevancy and the second relevancy while fixing the other of the first relevancy and the second relevancy. According to various embodiments, when the initial value for one of the first relevancy and the second relevancy is set in operation 431, in operation 432, the processor 120 of the electronic device 101 may fix one of the first relevancy and the second relevancy, of which the initial value is fixed, and may identify the value of the other of the first relevancy and the second relevancy. According to various embodiments, when the initial values for both of the first relevancy and the second relevancy are set in operation 431, in operation 432, the processor 120 of the electronic device 101 may fix an arbitrary one of the first relevancy and the second relevancy and may identify the value of the other of the first relevancy and the second relevancy.

According to various embodiments, when operation 432 is performed as the condition of operation 433, which will be described below, is not satisfied, the processor 120 of the electronic device 101 may fix a parameter that is different from the parameter fixed in operation 432 of the previous cycle among the first relevancy and the second relevancy. For example, when in the initial operation 432, the processor 120 of the electronic device 101 identified the value of the second relevancy while fixing the first relevancy and the second operation 432 is performed as the condition was not satisfied in the following operation 433, the processor 120 may identify the value of the first relevancy while fixing the second relevancy, contrary to the initial operation 432.

According to various embodiments, the second score may be denoted by $g_u$, the first relevancy may be denoted by $p_{ia}$, the second relevancy may be denoted by $p_a$, and $$\sum_{a \in F_1} p_{ia} p_a$$

calculated from the values of the first relevancy and the second relevancy may be denoted by $g_u'$. In this case, for example, when the processor 120 of the electronic processor 101 identifies the value of the second relevancy $p_a$ while fixing the first relevancy $p_{ia}$, the processor 120 may identify the second relevancy $p_a$ by which the sequence of $g_u'$ values for the first number of items and the sequence of the $g_u$ values, that is, the second scores are the same, may be identified while minimizing $\|g_u - g_u'\|^2$.

In operation 433, the processor 120 of the electronic device 101 may identify whether a change in at least one of the first relevancy or the second relevancy equal to or smaller than a predetermined level. When the change in the at least one of the first relevancy or the second relevancy is larger than the predetermined level, the processor 120 of the electronic device 101 may further repeat operations 432 and 433. Further, when the change in the at least one of the first relevancy or the second relevancy is equal to or smaller than the predetermined level, the processor 120 of the electronic device 101 no longer performs operations 432 and 433 and in operation 440 may identify the latest values of a first relevancy and a new second relevancy as the final values of the first relevancy and the second relevancy.

According to various embodiments, the change in the at least one of the first relevancy or the second relevancy may be a difference between a value of at least one of the first relevancy or the second relevancy, which has been identified in the most recent operation 432 and a value of at least one of the first relevancy or the second relevancy shortly before the at least one of the first relevancy or the second relevancy is changed due to the most recent operation 432.

In order to specify the change in the at least one of the first relevancy or the second relevancy, the at least one of the first relevancy or the second relevancy, which is a reference for determination, is required to be calculated at least two times. When the repetitions of operations 433 and 432 are not performed sufficiently and at least one of the first relevancy or the second relevancy, which is a reference for determination, is calculated two times or less, in operation 433, the processor 120 of the electronic device 101 may determine that the condition is not satisfied and may perform operation 432.

Figure 5:
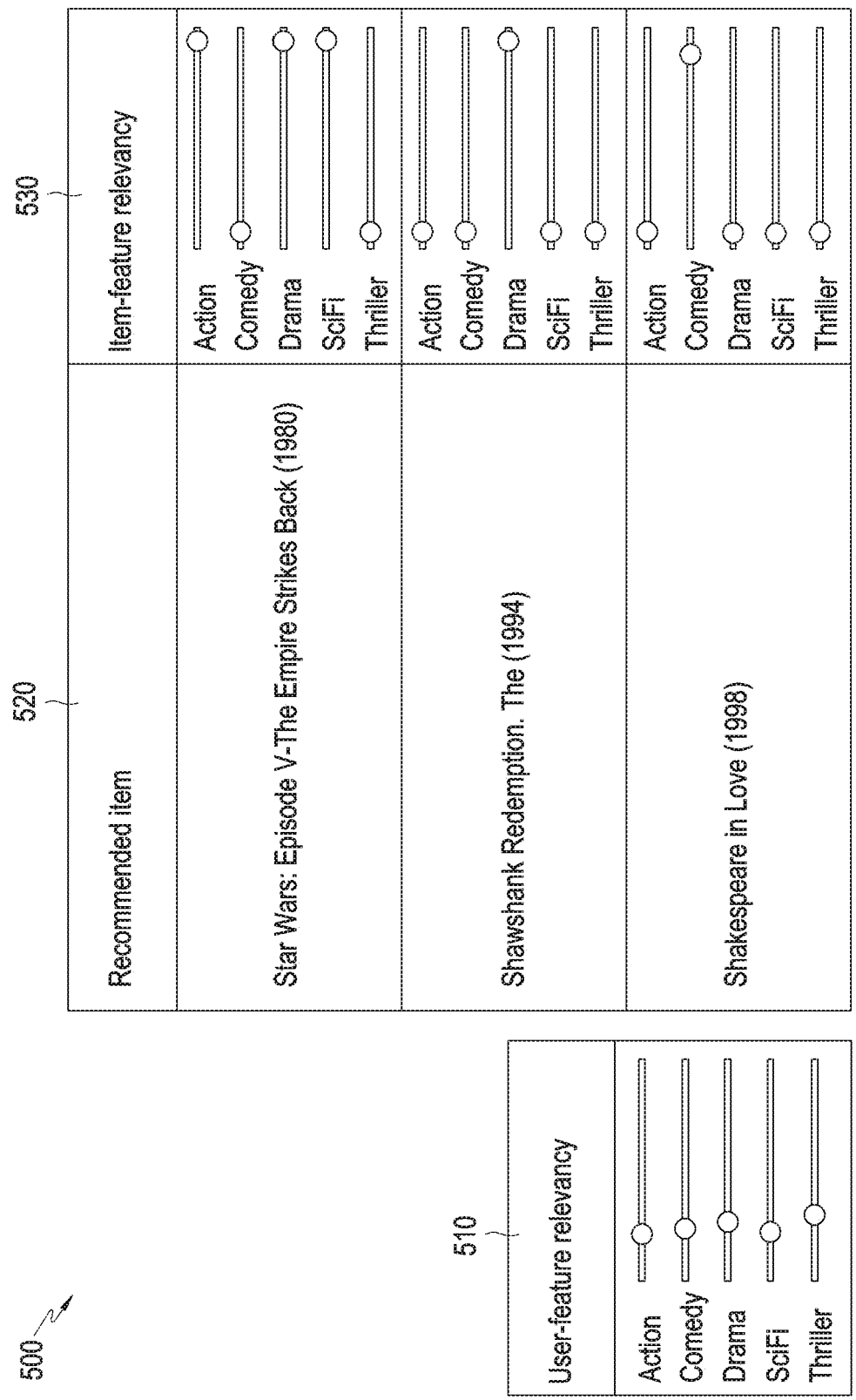
FIG. 5 illustrates a screen displayed by an electronic device according to various embodiments of the disclosure.

FIG. 5 illustrates a screen 500 displayed by an electronic device according to various embodiments of the disclosure. According to various embodiments, the screen 500 may be displayed on the display 213 of the electronic device 210, which has been described with reference to FIG. 2A. According to various embodiments, the screen 500 may be displayed on the display included in the second external electronic device 250, which has been described with reference to FIG. 2B.

A user-feature relevancy 510, a recommended item 520, and an item-feature relevancy 530 may be displayed on the screen 500. According to various embodiments, the fourth relevancy described with reference to operation 340 may be displayed in the screen 500 as a user-feature relevancy 510 in a slide bar form. According to various embodiments, one or more items included in the first list described with reference to operation 330 of FIG. 3 may be displayed in the screen 500 as a recommended item 520. According to various embodiments, the second relevancy described with reference to operation 340 may be displayed on the screen 500 as an item-feature relevancy 530 in a slide bar form.

Although FIG. 5 illustrates an example of displaying the third relevancy and the fourth relevancy in slide bar forms, the scheme of displaying the item included in the first list, the third relevancy, and the fourth relevancy is not limited to the example illustrated in FIG. 5. According to various embodiments, at least one of the third relevancy or the fourth relevancy may be displayed in a numeric character form. According to various embodiments, at least one of the third relevancy or the fourth relevancy may be displayed as a textual or graphic element that has different colors. For example, at least one of the third relevancy or the fourth relevancy may be divided into two or more zones, and a textual or graphic element of a red color may be displayed in a zone of a high relevancy whereas a textual or graphic element of a blue color may be displayed in a zone of a low relevancy.

Figure 6:
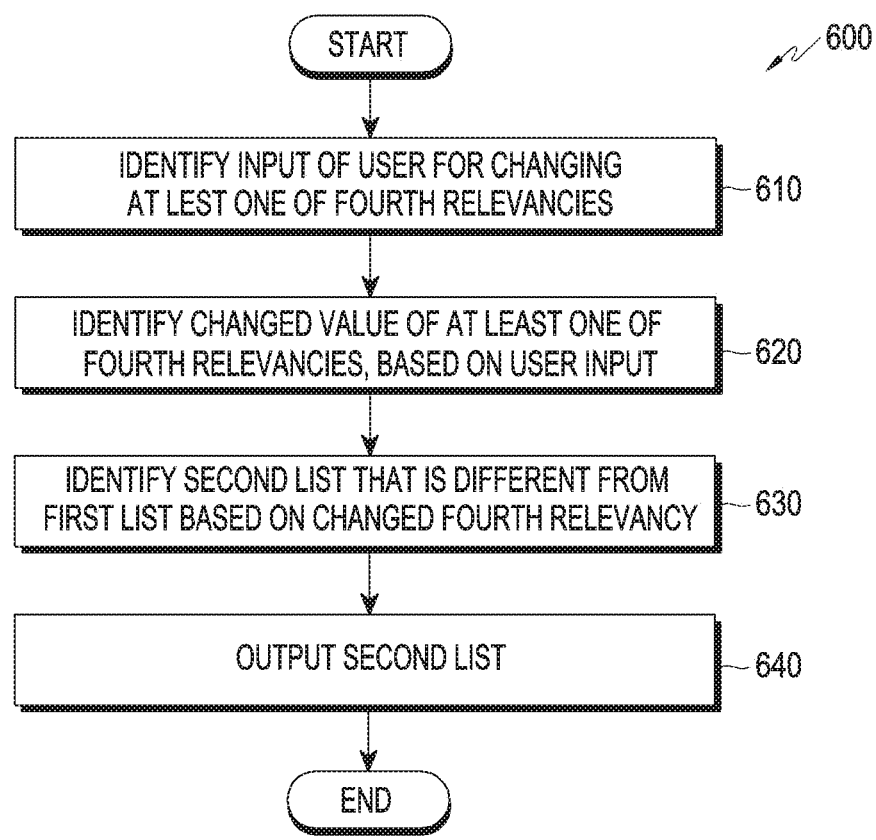
FIG. 6 illustrates a flowchart illustrating an operation of an electronic device according to various embodiments of the disclosure.

FIG. 6 illustrates a flowchart illustrating an operation 600 of an electronic device according to various embodiments of the disclosure. According to various embodiments, as described with reference to FIGS. 3 and 4, the operation illustrated in FIG. 6 may be performed by the processor 212 of the electronic device 210 described with reference to FIG. 2A, or may be performed by the processor 232 of the server 230 described with reference to FIG. 2B.

In operation 610, the processor (e.g., the processor 120) may identify an input by the user for changing at least one of the fourth relevancies. According to various embodiments, the fourth relevancy may be the fourth relevancy described with reference to operation 340 of FIG. 3. According to various embodiments, when operation 610 is performed by the processor 212 of the electronic device 210 described with reference to FIG. 2A, the input by the user may be input through the input device 214 of the electronic device 210. According to various embodiments, when operation 610 is performed by the processor 232 of the server 230 described with reference to FIG. 2B, the input by the user may be input through the input device included in the second external electronic device 250, and the processor 232 of the server 230 may identify the input by the user by receiving information of the user from the second external electronic device 250 through the communication module 231.

According to various embodiments, the user may quantitatively change at least one of the fourth relevancies through a user input. For example, the screen 500 of FIG. 5 may quantitatively change at least one of the fourth relevancies by moving an indicator in at least one of the slide bars displayed as the user-feature relevancy 510. In another example, when the fourth relevancy is displayed in a numeric character form, the user may quantitatively change at least one of the fourth relevancies by inputting a desired value for at least one of the fourth relevancies.

According to various embodiments, the user input may represent a qualitative change in the at least one of the fourth relevancies. For example, the user may increase or decrease the relevancy value corresponding to the specific feature by selecting a button for increasing or decreasing the fourth relevancy displayed on the screen. For example, the button displayed on the screen may be a button for "No interest in Action Genre".

In operation 620, the processor 120 may identify a changed value of at least one of the fourth relevancies, based on the identified user input. According to various embodiments, when the user input is an input for quantitatively changing at least one of the fourth relevancies, the processor 120 may identify a value of the at least one of the fourth relevancies, which has been specified by the user input, as a changed value. According to various embodiments, when the user input represents a qualitative change in at least one of the fourth relevancies, the processor 120 may identify the changed value of the at least one of the fourth relevancies based on a preset rule. For example, the processor 120 may increase or decrease, in response to selection of a button for increasing or decreasing the fourth relevancy displayed on the screen, the fourth relevancy corresponding to the selected button by 10% p. In another example, when a button for "No Interest" for a specific feature is selected, the processor 120 may set the fourth relevancy corresponding to the feature to a preset value, for example, 0.

In operation 630, the processor 120 may identify a second list which is an updated version of the first list based on the changed fourth relevancy. According to various embodiments, the processor 120 may identify a changed second score by inserting the changed fourth relevancy into p(a|u,s) of Equation 2, and may identify a list of the second number of items having the highest changed second score as the second list. According to various embodiments, the processor 120 may perform again operations 430 to 440 of FIG. 4 and operations 320 to 330 of FIG. 3 while treating the changed fourth relevancy as a constant, without changing the second score.

In operation 640, the processor 120 may output the second list. According to various embodiments, the processor 120 may identify the third relevancy and the fourth relevancy, which have been updated, by performing operation 340 of FIG. 3 for the item of the second list and may output the updated third relevancy and fourth relevancy together with the second list. According to various embodiments, the details described with reference to operation 350 of FIG. 3 for the output of the first list may be applied to operation 640 in the same way.

Figure 7A:
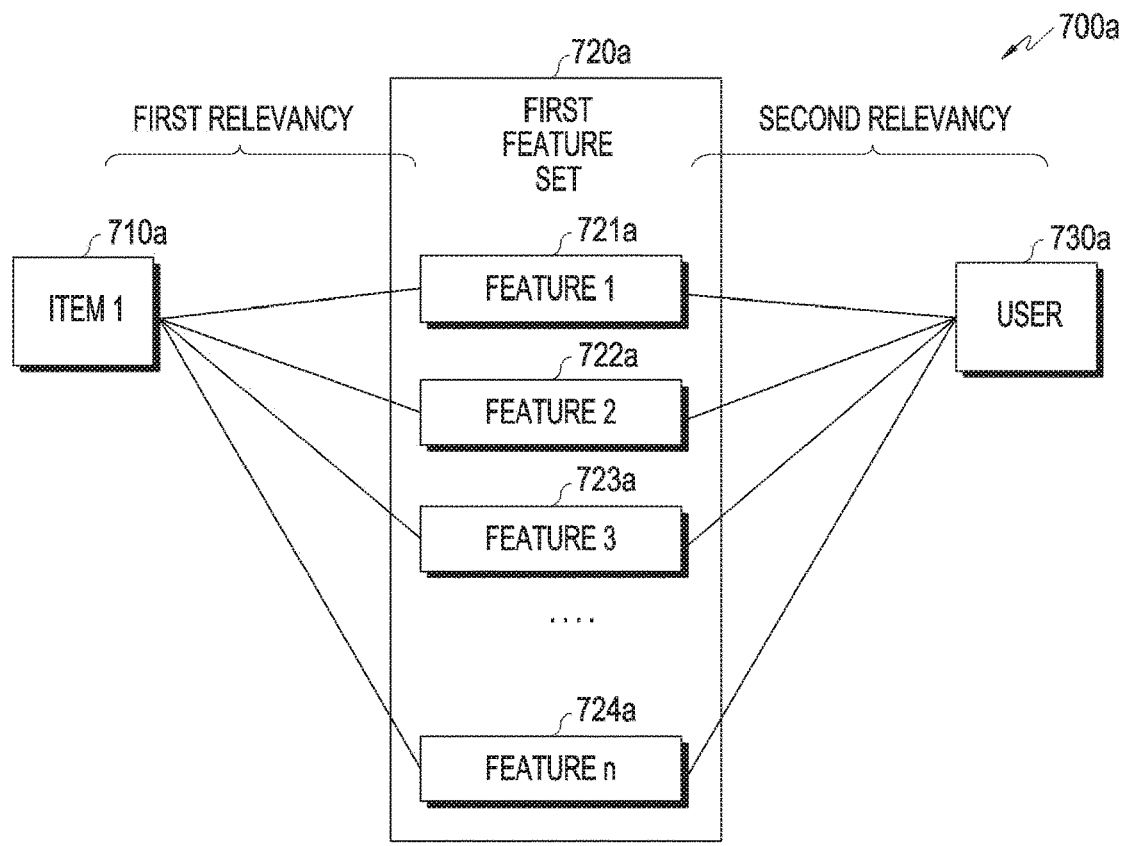
FIG. 7A illustrates a block diagram for explaining a relationship between an item, a feature set, and the user when one feature set is provided according to various embodiments of the disclosure.

FIG. 7A illustrates a block diagram 700a for explaining a relationship between an item, a feature set, and a user when one feature set is provided according to various embodiments of the disclosure. In the block diagram 700a, feature 1 721a, feature 2 722a, feature 3 723a, . . . , and feature n 724a that are the elements of the first feature set 720a may be associated with the items 710a by the first relevancies, respectively. Further, feature 1 721a, feature 2 722a, feature 3 723a, . . . , and feature n 724a may be associated with the user 730a by the second relevancies, respectively. Although only one item 1 710a is illustrated in FIG. 7A for convenience of description, all the items included in the list of the first number of items may be associated with the elements of the first feature set 720a, by the first relevancies, like item 1 710a.

Figure 7B:
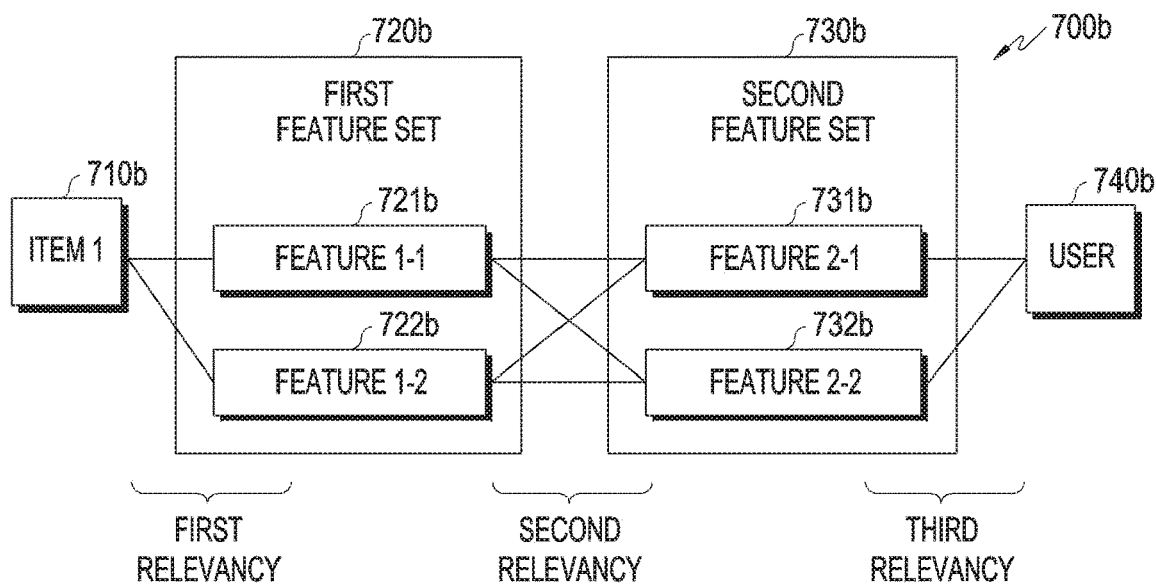
FIG. 7B illustrates a block diagram for explaining a relationship between an item, feature sets, and the user when two feature sets are provided according to various embodiments of the disclosure.

FIG. 7B illustrates a block diagram for explaining a relationship between an item, feature sets, and a user when two feature sets are provided according to various embodiments of the disclosure. In the block diagram 700b, feature 1-1 721b and feature 1-2 722b that are the elements of the first feature set 720b may be associated with the items 710b by the first relevancies, respectively. Further, feature 1-1 721b and feature 1-2 722b that are the elements of the first feature set 720b may be associated with feature 2-1 731b and feature 2-2 732b that are the elements of the second feature set 730b by the second relevancies, respectively. Further, feature 2-1 731b and feature 2-2 732b that are the elements of the second feature set 730b may be associated with the user 740b by the third relevancies.

Although only one item 1 710a is illustrated in FIG. 7B for convenience of description, all the items included in the list of the first number of items may be associated with the elements of the first feature set 720b, by the first relevancies, like item 1 710b. Further, although it is illustrated, for convenience of illustration in FIG. 7B that the numbers of the elements of the first feature set 720b and the second feature set 730b are two, the numbers of the elements of the first feature set 720b and the second feature set 730b may be any number that is more than two.

According to various embodiments, the number of the feature sets may be more than two.

Figure 8:
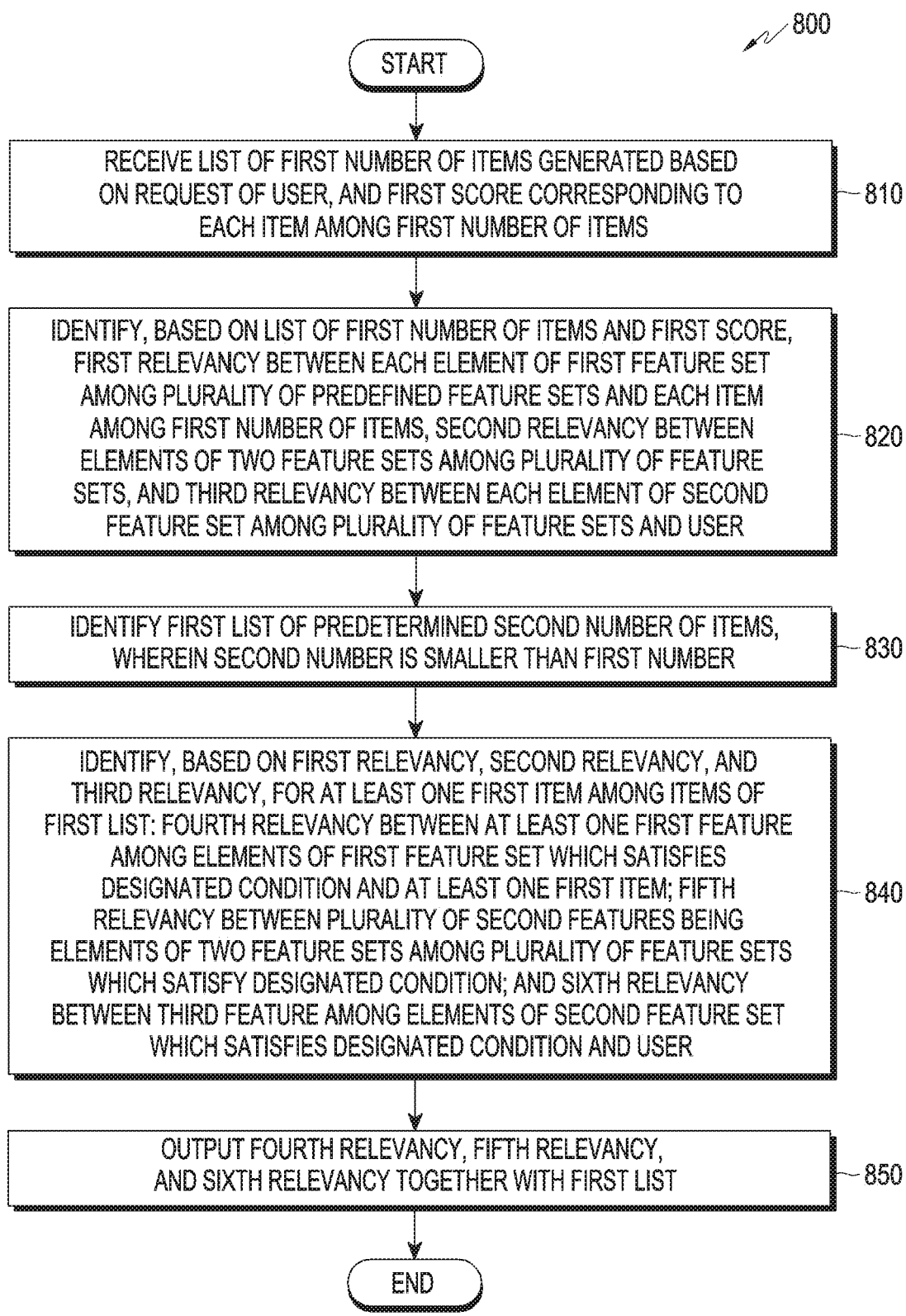
FIG. 8 illustrates a flowchart illustrating an operation of an electronic device according to various embodiments of the disclosure.

FIG. 8 illustrates a flowchart illustrating an operation 800 of an electronic device according to various embodiments of the disclosure. Since the operations illustrated in FIG. 8 are the same as the operations illustrated in FIG. 3, except for the fact that the number of the feature sets is two or more, parts common to the operations illustrated in FIG. 3 will not be repeated here.

In operation 810, the processor (e.g., the processor 120) may receive a list of a first number of items generated based on a request of the user, and a first score corresponding to each item among the first number of items. The details of operation 310 of FIG. 3 may be applied to operation 810 in the same way or similarly.

In operation 820, the processor 120 may identify, based on the list of the first number of items and the first score: a first relevancy between each element of a first feature set among a plurality of predefined feature sets and each item among the first number of items; a second relevancy between elements of two feature sets from among the plurality of feature sets; and a third relevancy between the user and each element of a second feature set from among the plurality of feature sets. The details of operation 320 of FIG. 3 and the operations of FIG. 4 may be applied to operation 820 in the same way or similarly.

However, as compared with operation 430 of FIG. 4, operation 820 is different in that the relationship between the second score, and the first relevancy, the second relevancy, and the third relevancy is expressed as follows.

$$g(s) = \sum_{a \in F_1, b \in F_2, c \in F_3} p(rel_i \mid a)p(a \mid b)p(b \mid c)p(c \mid u) \quad \text{Equation 12}$$

Equation 12 represents the relationship between the second score, and the first relevancy, the second relevancy, and the third relevancy in a case in which the feature sets are three, that is, $F_1$, $F_2$, and $F_3$. In Equation 12, $p(rel_i|a)$ denotes a first relevancy, $p(a|b)$ and $p(b|c)$ denote second relevancies, and $p(c|u)$ denotes a third relevancy.

Further, in operation 820, operation 432 of FIG. 4 is extended to identifying one of the first relevancy, the second relevancy, and the third relevancy, while fixing the remaining ones. For example, in the example to which Equation 12 is applied, the processor 120 may identify, while fixing three probabilities among $p(rel_i|a)$, $p(a|b)$, $p(b|c)$, and $p(c|u)$, a value of a probability of the remaining one which makes the sequence of the value of $g_u'$ for the first number of items and the value of $g_u$, that is, the sequence of the second scores, identical and minimizes $\|g_u - g_u'\|^2$.

Further, in operation 820, operation 433 of FIG. 4 is extended to identifying whether a change in a probability of at least one of the first relevancy, the second relevancy, and the third relevancy is equal to or smaller than a predetermined level. Further, in operation 820, operation 440 of FIG. 4 is extended to identifying the latest values of the first relevancy, the second relevancy, and the third relevancy as the final values of the first relevancy, the second relevancy, and the third relevancy.

In operation 830, the processor 120 may identify a first list of a predetermined second number of items, wherein the second number is smaller than the first number. The details of the operation 330 of FIG. 3 may be applied to operation 830 in the same way or similarly.

In operation 840, the processor 120 may identify, for a least one first item among the items of the first list, based on the first relevancy, the second relevancy, and the third relevancy: a fourth relevancy between at least one first item and at least one first feature among the elements of the first feature set which satisfies a designated condition; a fifth relevancy between a plurality of second features among the elements of the two feature sets among the plurality of feature sets which satisfy a designated condition; and a sixth relevancy between the user and a third feature among the elements of the second feature set which satisfies a designated condition. The details of the operation 340 of FIG. 3 may be applied to operation 840 in the same way or similarly.

In operation 850, the processor 120 may output the fourth relevancy, the fifth relevancy, and the sixth relevancy, together with the first list. The details of the operation 350 of FIG. 3 may be applied to operation 850 in the same way or similarly.

In order to verify an operation result of the first model expressed by Equation 1, a movie lens 1M dataset was used, and the following algorithm was used as a recommended algorithm corresponding to the recommended system of the first external electronic device.

TABLE 1

| | |
|---|---|
| ub | A user based kNN recommended algorithm. ub obtains the following scores for items evaluated by neighboring communicates after constructing neighboring communities $N_u$ of k > 0 that is most similar to the user u. $$s(i \mid u) = \sum_{\{v \in N_u \mid (v,i) \in T\}} sim_{uv} r_{vi}$$ |
| ib | An item based kNN recommended algorithm. ib obtains the following scores for all the neighboring communities after constructing neighboring communities after construing neighboring communities Ni of k > 0 that is most similar to the items in the profile of the user u. $$s(i \mid u) = \sum_{\{j \mid i \in N_j, (u,j) \in T\}} sim_{ij} r_{uj}$$ |
| HKV | A matrix factorization algorithm suggested by Hu Yifan, Yehuda Koren, and Chris Volinsky. When a dimension of a feature space m << \|U\|, \|I\| is given, HKV factorizes an interaction matrix by a \|U\| × m user matrix P = $\{p_{ul}\}$ and a \|I\| × m item matrix Q = $\{q_{il}\}$. The factorized user matrix and item matrix satisfy the following relationships. $$s(i \mid u) = \sum_l p_{ul} q_{il}$$ |
| PLSA | A PLSA algorithm of Hoffman |

In order to verify the operation result of the first model, $p(rel_i|u)$ expected by inserting Equations 8 and 9 according to the aspect models of Vargas and Castells into Equation 2 was compared with a first model $g(i|u)$ of Equation 1. The predicted accuracies of the upper N lists that are the comparison references are values obtained by multiplying the probability by which the items in the upper N item set is within the related items in a test set, by ratios of test set items for users.

$$E[prec@N] = \frac{|T_e|}{|U|} \left( \frac{1}{|U|N} \sum_u \sum_{i \in R_u} p(rel_i \mid u) p(s) \right) \quad \text{Equation 13}$$

In Equation 13, p(s) is a probability by which the item having the score s is included in the test set $T_e$.

Further, for the test set data, an ROC analysis was carried out while using $p(rel_i/u)$ as a predicted score and using $rel_i$ as a class label. The comparison result is as in Table 2.

TABLE 2

| | | aspect_v | | g(s(i\|u)) | |
|---|---|---|---|---|---|
| algorithm | prec@20 | E[prec@20] | AUC | E[prec@20] | AUC |
| ub | 0.122 | 0.019 | 0.702 | 0.100 | 0.769 |
| ib | 0.112 | 0.013 | 0.013 | 0.094 | 0.696 |
| HKV | 0.137 | 0.021 | 0.021 | 0.112 | 0.775 |
| PLSA | 0.125 | 0.017 | 0.017 | 0.103 | 0.729 |

In Table 2, aspect_v means aspect models of Vargas and Castells. As compared with the aspect models of Vargas and Castells, it can be seen that in the first model of Equation 1, values of E[prec@20] and AUC are greater for all recommended algorithms.

Figure 9A:
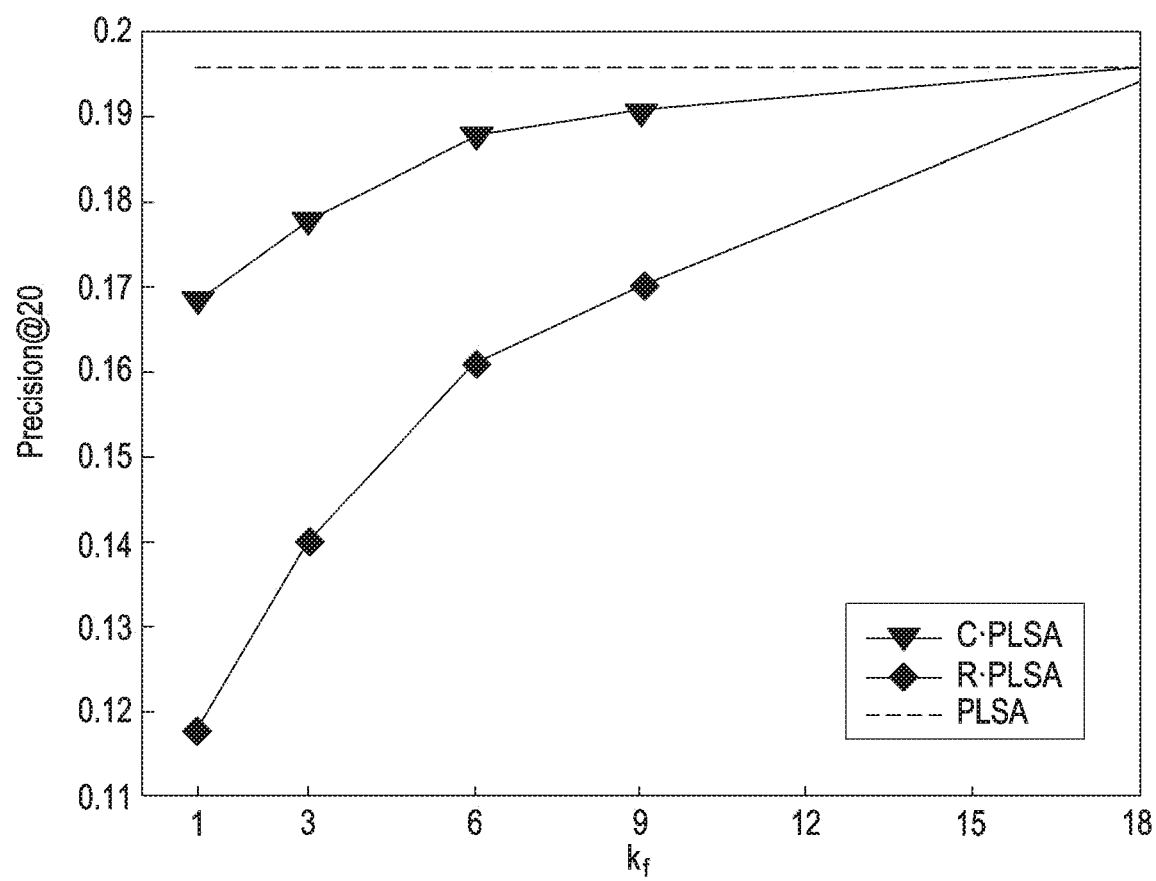
FIGS. 9A and 9B illustrate graphs depicting operation results of an electronic device according to various embodiments of the disclosure.
Figure 9B:
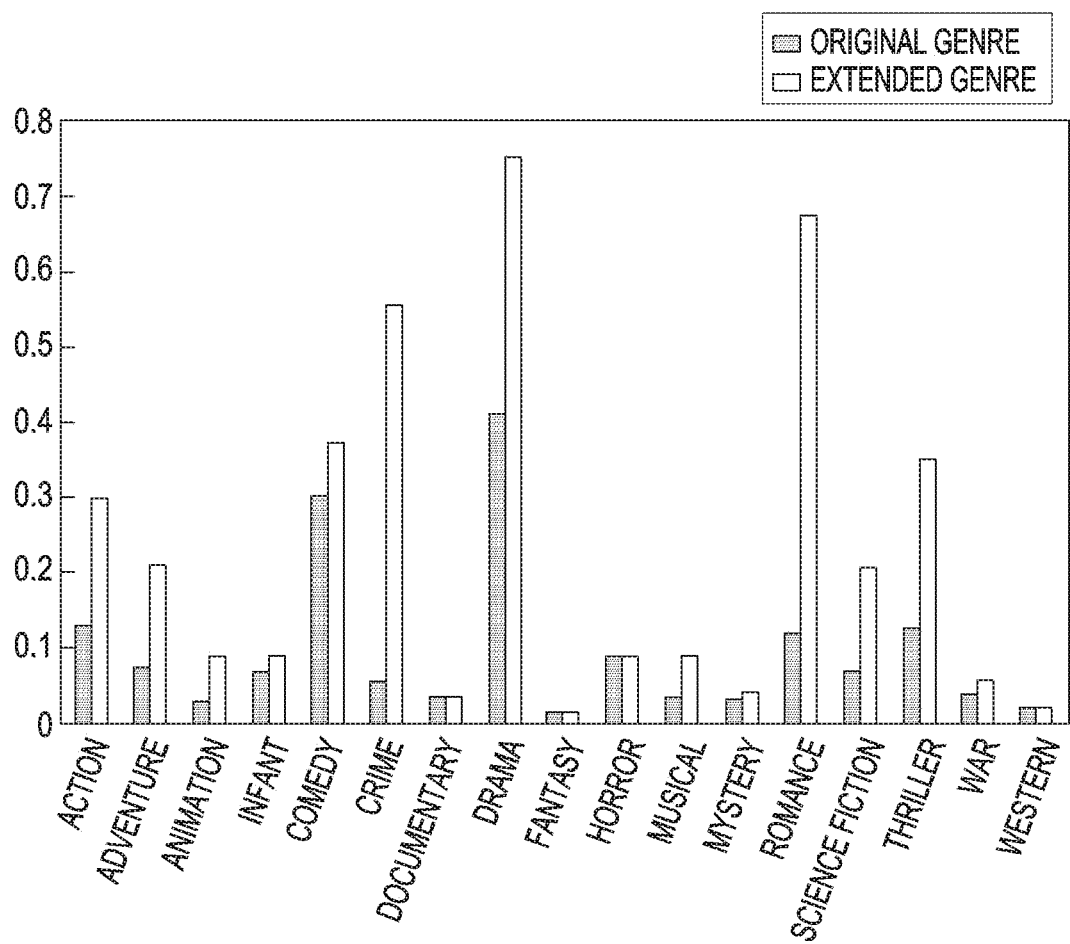
Figure 10A:
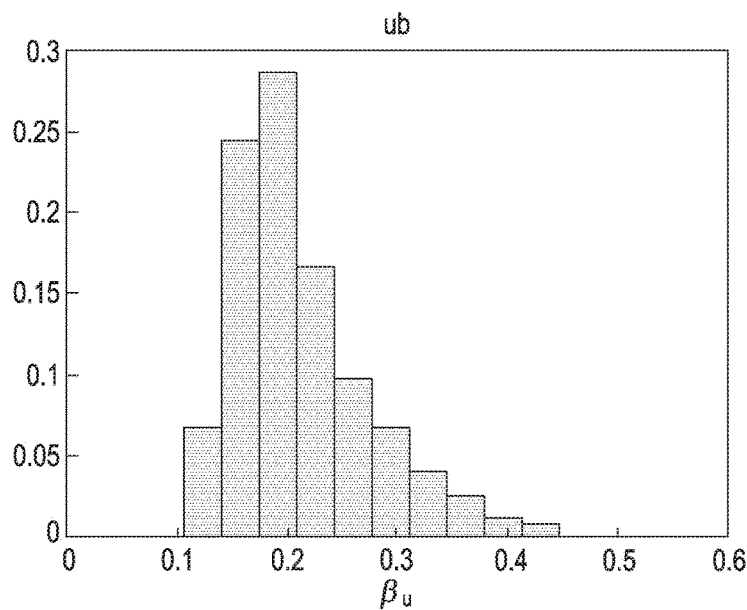
Figure 10B:
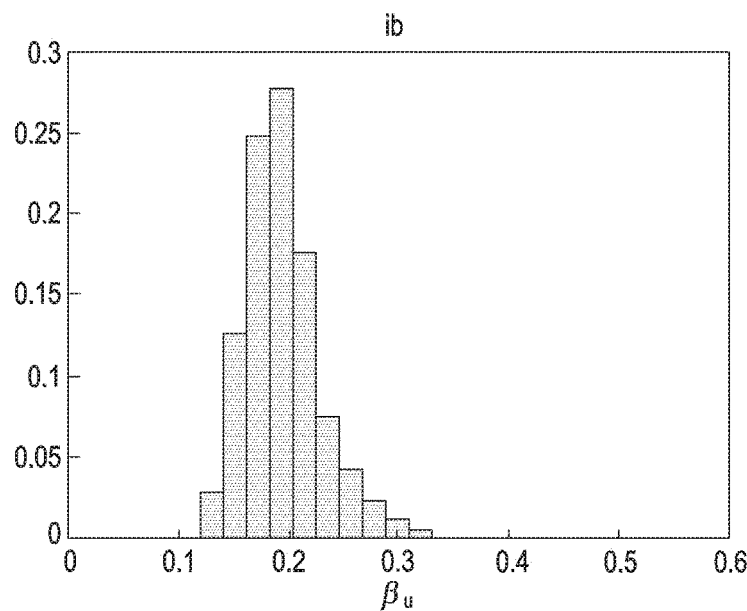
Figure 10C:
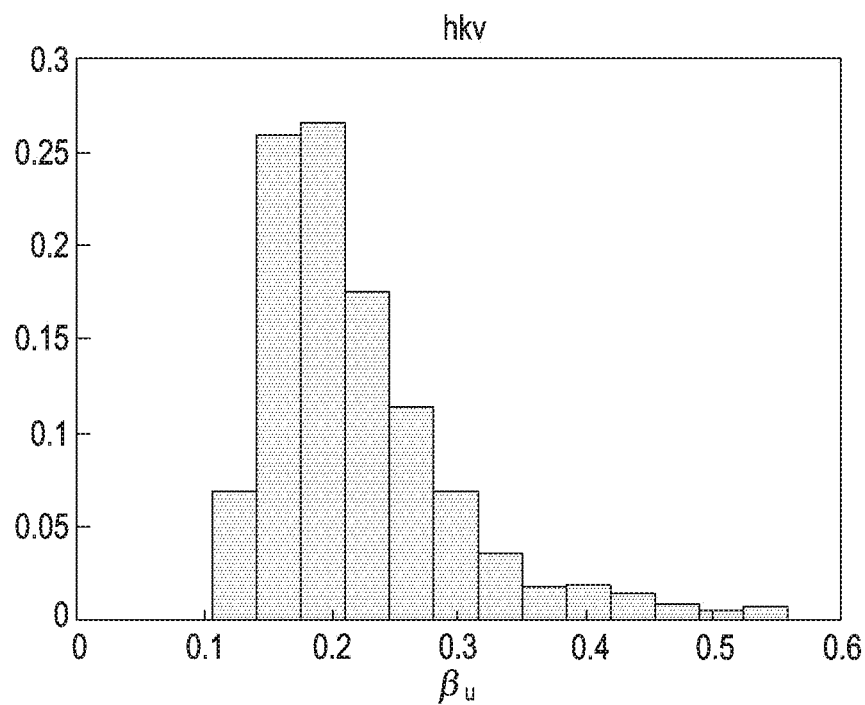
Figure 10D:
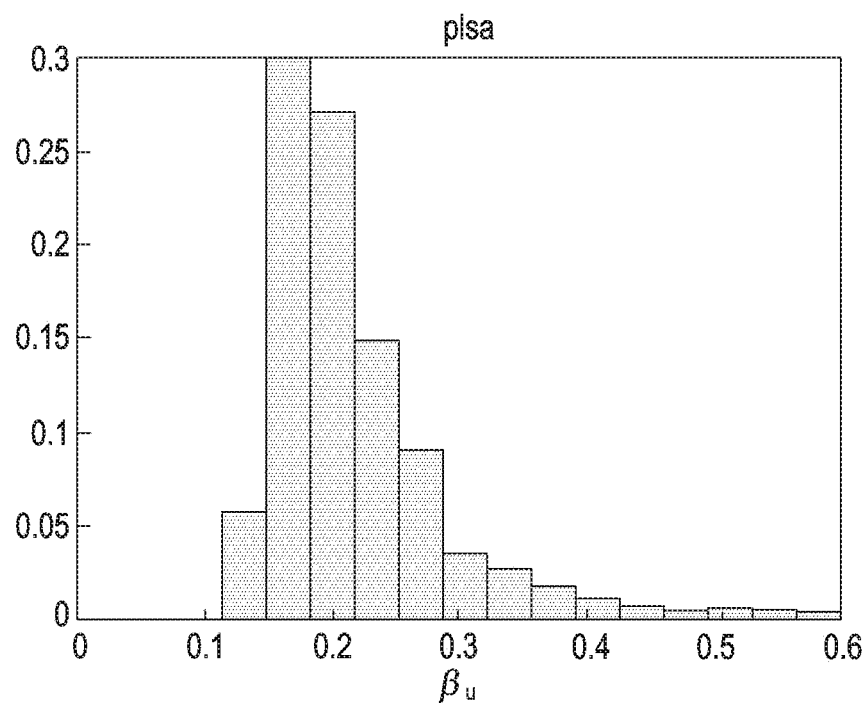
Figure 11A:
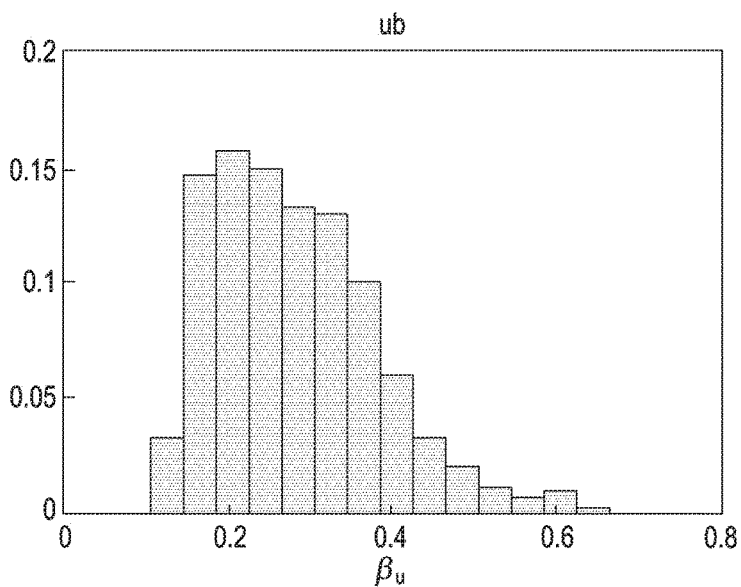
Figure 11B:
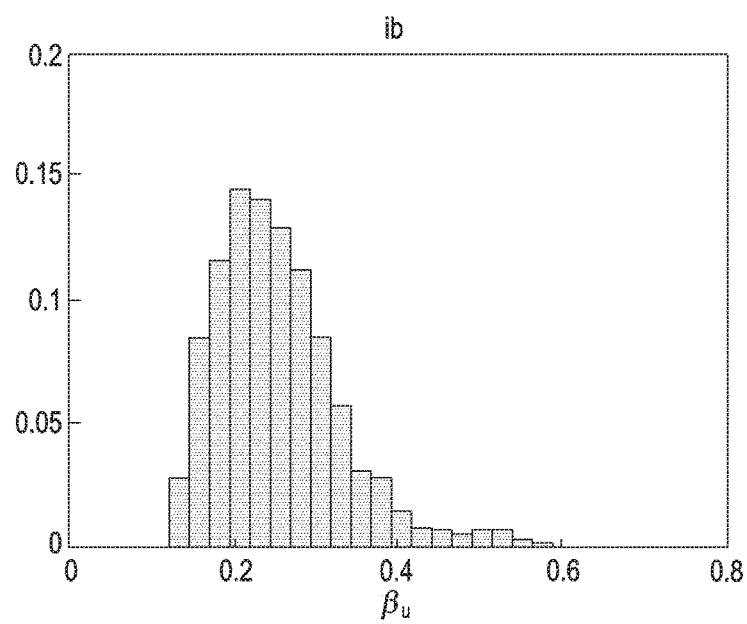
Figure 11C:
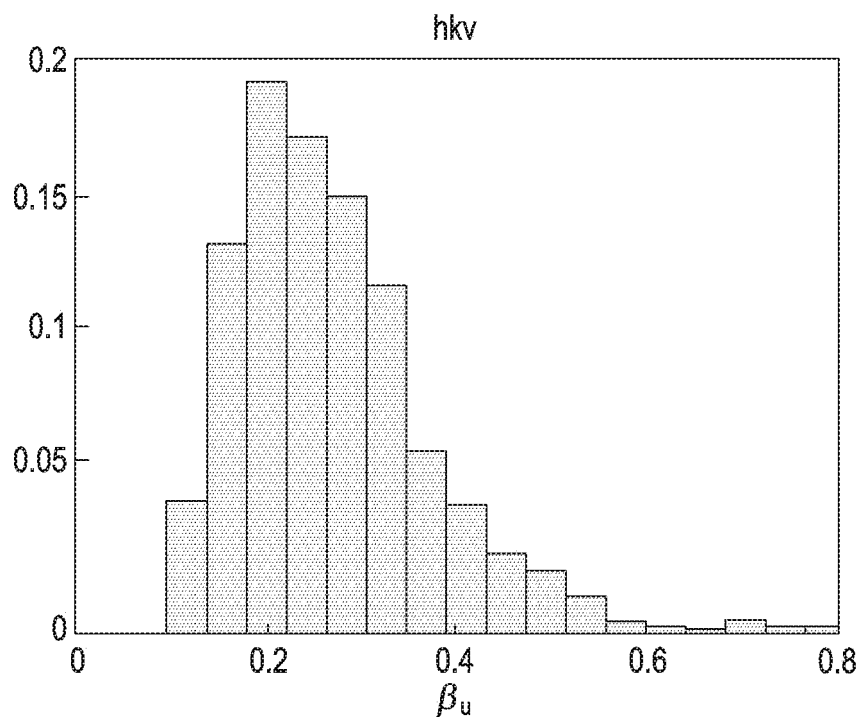
Figure 11D:
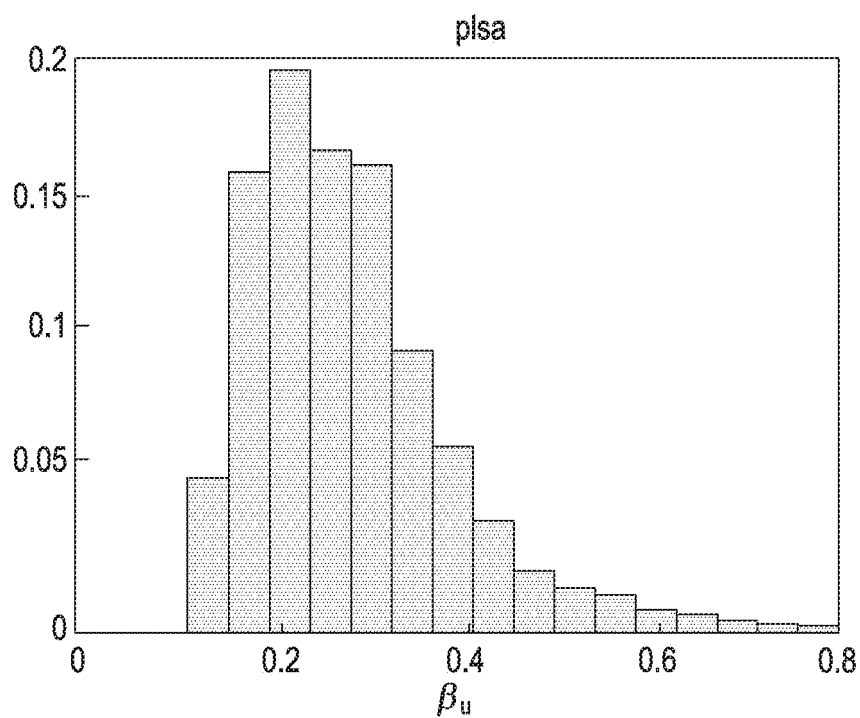
Figure 12A:
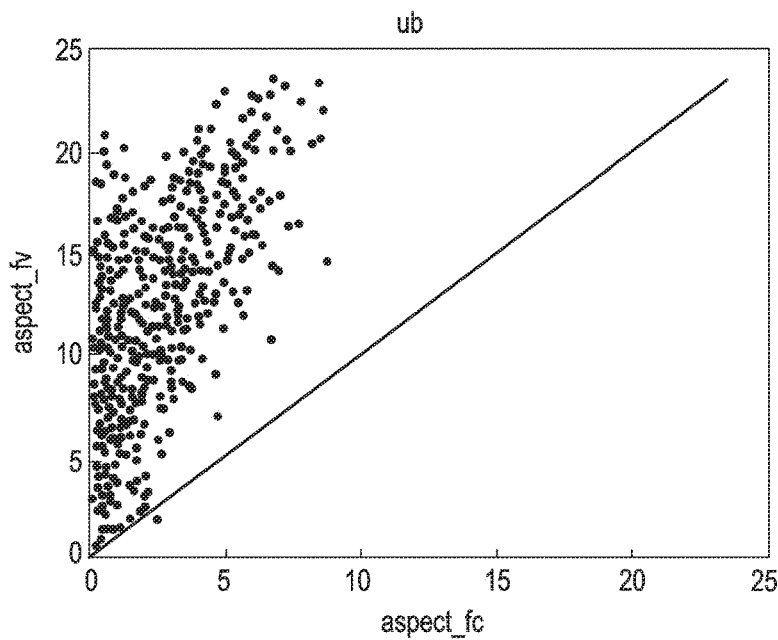
FIGS. 12A, 12B, 12C, and 12D illustrate graphs depicting operation results of an electronic device according to various embodiments of the disclosure.
Figure 12B:
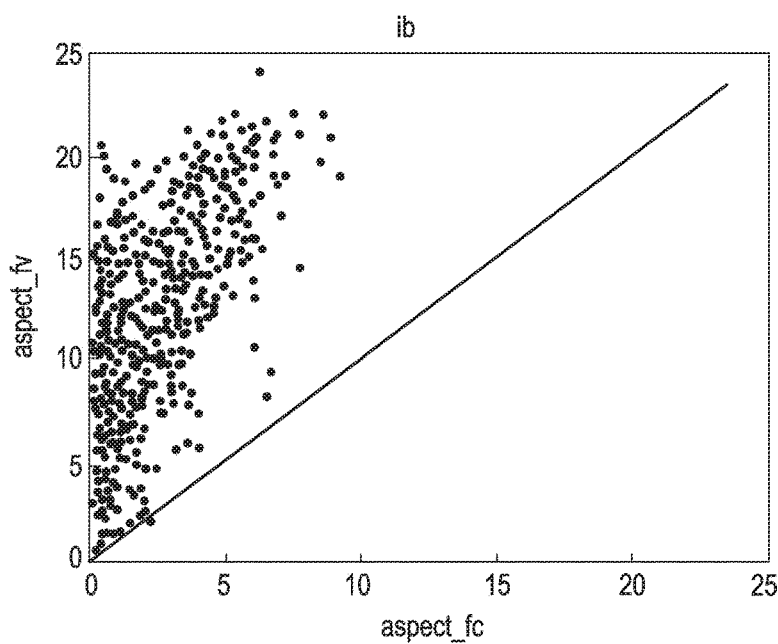
Figure 12C:
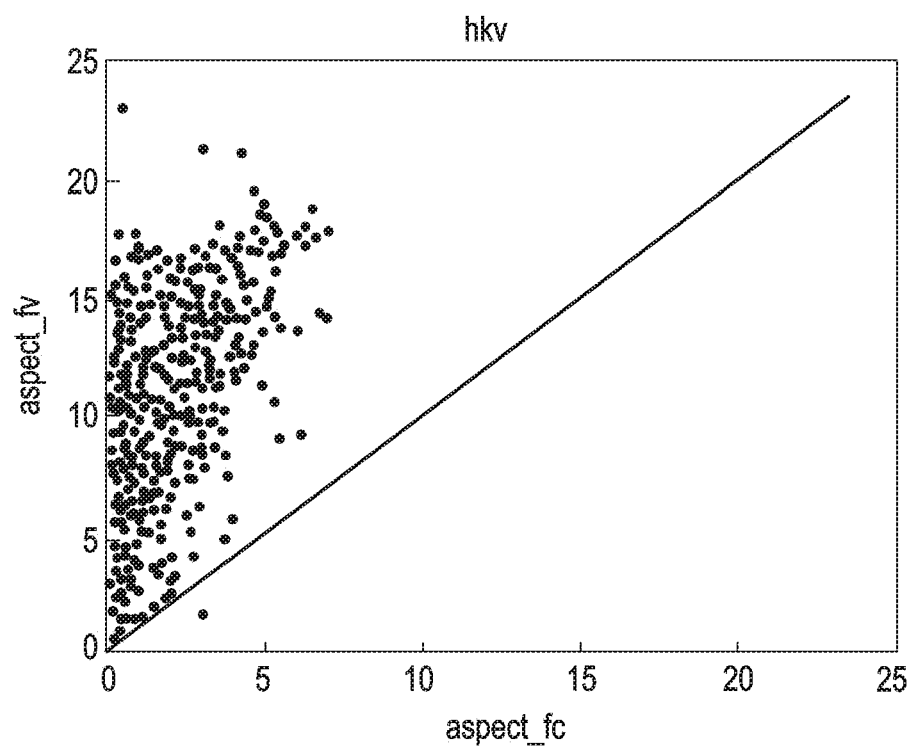
Figure 12D:
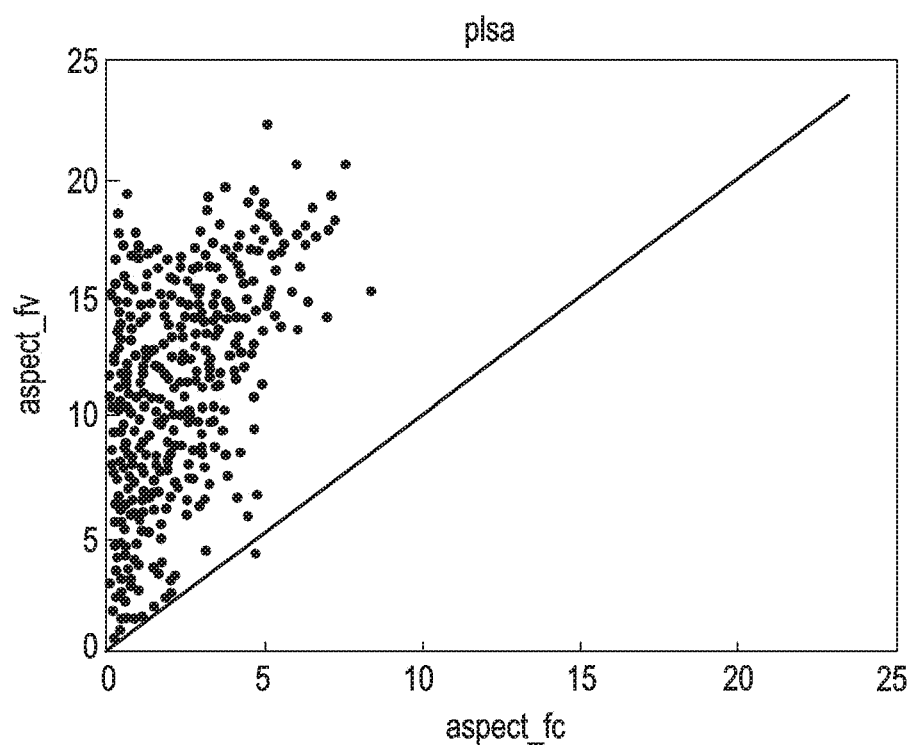

FIGS. 9A and 9B illustrate graphs depicting operation results of an electronic device according to various embodiments of the disclosure. In detail, FIGS. 9A and 9B are graphs for explaining an operation result of extended c-PLSA.

In FIG. 9A, the accuracies, when N=20, for the different $k_F$ values of the extended c-PLSA, the PLSA that is different from the extended c-PLSA, and the PLSA, which have been described with reference to operation 431 are denoted by C-PLSA, R-PLSA, and PLSA.

FIG. 9B is a bar graph depicting the ratios of the items including genres when $k_F$ is 1 and 3 in the extended c-PLSA described with reference to operation 431. It can be identified from FIG. 9B that diversity becomes higher when the extended genre is used.

FIGS. 10A, 10B, 10C, and 10D illustrate histograms depicting operation results of an electronic device according to various embodiments of the disclosure.

In detail, FIGS. 10A to 10D are graphs for explaining an operation result in the case in which the aspect models of Vargas and Castells are used to specify the value of $\pi_{aiu}$, in the setting of an initial value of operation 431 of FIG. 4. FIGS. 10A, 10B, 10C, and 10D illustrate histograms of the values of $\beta_u = 1 - |g_u - g_u'|/|g_u|$ when the recommended algorithms corresponding to the first external electronic device 220 are ub, ib, HKV, and PLSA.

FIGS. 11A, 11B, 11C, and 11D illustrate histograms depicting operation results of an electronic device according to various embodiments of the disclosure. In detail, FIGS. 10A to 10D are graphs for explaining an operation result in the case in which the extended c-PLSA having $k_F$ of 3 is used to specify the value of $\pi_{aiu}$, in the setting of an initial value of operation 431 of FIG. 4. FIGS. 11A, 11B, 11C, and 11D illustrate histograms of the values of $\beta_u = 1 - |g_u - g_u'|/|g_u|$ when the recommended algorithms corresponding to the first external electronic device 220 are ub, ib, HKV, and PLSA.

FIGS. 12A, 12B, 12C, and 12D illustrate graphs depicting operation results of an electronic device according to various embodiments of the disclosure.

In detail, FIGS. 12A, 12B, 12C, and 12D are graphs obtained by plotting divergences in the case in which the aspect models of Vargas and Castells are used to specify the value of $\pi_{aiu}$ and in the case in which the extended c-PLSA having $k_F$ of 3 in the initial value setting of operation 431 of FIG. 4 when the recommended algorithms corresponding to the first external electronic device 220 are ub, ib, HKV, and PLSA. Kullback-Liebler divergence is expressed in the following equation.

$$D(p\|q) = \Sigma p_a \log(q_a/p_a) \qquad \text{Equation 14}$$

In FIGS. 12A to 12D, aspect_fc of the x axis is a divergence between a second relevance value identified by using the extended c-PLSA having $k_F$ of 3 to specify the value of $\pi_{aiu}$ in the initial value setting of operation 431 of FIG. 4 and a second relevance value identified in the extended c-PLSA model having $k_F$ of 3. Further, in FIGS. 12A to 12D, aspect_fv of the y axis is a divergence between a second relevance value identified by using the aspect models of Vargas and Castells to specify the value of $\pi_{aiu}$ in the initial value setting of operation 431 of FIG. 4 and a second relevance value identified in the extended c-PLSA model having $k_F$ of 3.

In FIGS. 12A to 12D, it can be seen from the fact that most of the points are located above the graph of x=y that the second relevance values when the extended c-PLSA having $k_F$ of 3 is used in the initial setting of operation 431 of FIG. 4 to specify the value of $\pi_{aiu}$ is more similar than when the other models are used.

According to various embodiments, an electronic device 210 and a server 230 may include communication modules 211 and 231 and at least one processor 212 and 232, the at least one processor 212 and 232 may be configured to receive, from a first external electronic device 220 and 240 through the communication modules 211 and 231, a list of a first number of items generated based on a request of a user and a first score corresponding to each item among the first number of items, at least based on the list of the first number of items and the first score, identify a first relevancy between each element of a predetermined first feature set and each item among the first number of items and a second relevancy between each element of the first feature set and the user, identify a first list of a predetermined second number of items, the second number being smaller than the first number, identify, for at least one first item among the items of the first list, a third relevancy between at least one first feature among the elements of the first feature set which satisfies a designated condition and the at least one first item and a fourth relevancy between the at least one first feature and the user, based on the first relevancy and the second relevancy, and output the third relevancy and the fourth relevancy, together with the first list, and the first list may be a list of the second number of items among the first number of items having the highest first score.

According to various embodiments, the at least one processor 212 and 232 may be configured to identify a first model having the first score as an input and the second score as an output, based on history of the list of the first number of items identified by a first external electronic device 220 and 240 and the first score corresponding to each item among the list of the first number of items included in the history, and the first model may be a function that monotonically increases with respect to the first score.

According to various embodiments, the first model may satisfy $$g(s(i \mid u)) = \frac{1}{1 + \exp(-b_0 - b_1 s(i \mid u))},$$

wherein s(i|u) is the first score, and g(s(i|u)) is the second score.

According to various embodiments, the at least one processor 212 and 232 may be configured to, in order to identify the first relevancy and the second relevancy, identify the second score of each item among of the first number of items by using the first model, and for the second score of each item among the first number of items, identify the first relevancy and the second relevancy which satisfy $$g(s) = \sum_{a \in F_1} p(rel_i \mid a, s) p(a \mid u, s)$$

wherein g(s) is the second score, $F_1$ is the first feature set, $p(rel_i|a,s)$ is the first relevancy that is a probability by which each element of the first feature set is associated with each item among the first number of items, and p(a|u,s) is the second relevancy that is a probability by which each element of the first feature set is associated with the user.

According to various embodiments, the at least one processor 212 and 232 may be configured to, in order to identify the first relevancy and the second relevancy which satisfy the following equation for the second score of each item among the first number of items, $$g(s) = \sum_{a \in F_1} p(rel_i \mid a, s) p(a \mid u, s),$$

set initial value of at least one of the first relevancy or the second relevancy and repeatedly identify a value of one of the first relevancy and the second relevancy while fixing the other of the first relevancy and the second relevancy.

According to various embodiments, the operation of identifying the value of one of the first relevancy and the second relevancy while fixing the other of the first relevancy and the second relevancy may be repeated until at least one of change in the first relevancy or the second relevancy becomes equal to or smaller than a predetermined level.

According to various embodiments, the initial value of the at least one of the first relevancy or the second relevancy may be identified at least based on an item selection history of the user.

According to various embodiments, the initial value of at least one of the first relevancy or the second relevancy may be identified based on at least one first score corresponding to at least one item related to each element of the first feature set.

According to various embodiments, the electronic device 210 may further include a display 213 and an input device 214, and the at least one processor 212 is configured to identify a request of the user for an item list, through the input device 214, in response to the request of the user for the item list, request the list of the first number of items and the first score corresponding to each item among the first number of items, through the communication modules 211 and 231 to the first external device 220 and 240, output the first list by displaying the first list on the display 213, and output the third relevancy and the fourth relevancy by displaying the third relevancy and the fourth relevancy on the display 213.

According to various embodiments, at least one of the electronic devices 210 and 230 may be a server, and the at least one processor 212 and 232 may be configured to receive a request of the user for an item list from a second external electronic device 250 through the communication modules 211 and 231, in response to the request of the user for the item list, request the list of the first number of items and the first score corresponding to each item among the first number of items through the communication modules 211 and 231 to the first external electronic device 220 and 240, and output the third relevancy and the fourth relevancy together with the first list by transmitting the first list, the third relevancy, and the fourth relevancy to the second external electronic device 250.

According to various embodiments, the at least one processor 212 and 232 may be further configured to identify an input by the user for changing at least one of fourth relevancies, identify a changed value of the at least one of the fourth relevancies, the changed value being identified based on the input by the user, update the first list to identify a second list of the second number of items based on the changed value of the at least one of the fourth relevancies, and output the second list.

According to various embodiments, the input by the user may indicate the changed value of the at least one of the fourth relevancies.

According to various embodiments, the electronic device 210 and the server 230 may include communication modules 211 and 231, and at least one processor 212 and 232, and the at least one processor 212 and 232 may be configured to transmit a query to the first external electronic device 220 and 240 through the communication modules 211 and 231, receive a list of items corresponding to the query from the first external electronic device 210 and the server 230 through the communication modules 211 and 231, identify at least one element among elements of a feature set associated with the items, and a first relevancy between the at least one element and each of the items, identify a second relevancy between the at least one element and a user associated with the query, and provide, together with at least some of the items, a reason for recommendation, based on the first relevancies, the second relevancy, and the at least one element.

According to various embodiments, a method executed by an electronic device 210 and the server 230 may include receiving, from a first external electronic device 220 and 240 a list of a first number of items generated based on a request of a user, and a first score corresponding to each item among the first number of items, identifying a first relevancy between each element of a predetermined first feature set and each item among the first number of items, and a second relevancy between each element of the first feature set and the user, identifying a first list of a predetermined second number of items, the second number being smaller than the first number, identifying, for at least one first item among the items of the first list, a third relevancy between at least one first feature among the elements of the first feature set which satisfies a designated condition and the at least one first item, and a fourth relevancy between the at least one first feature and the user, based on the first relevancy and the second relevancy, and outputting the third relevancy and the fourth relevancy, together with the first list, and the first list may be a list of the second number of items among the first number of items having the highest first score.

According to various embodiment, the identifying of the first relevancy and the second relevancy may include identifying a first model having the first score as an input and the second score as an output, based on history of the list of the first number of items identified by a first external electronic device 220 and 240 and the first score corresponding to each item among the list of the first number of items included in the history and wherein the first model may be a function that monotonically increases with respect to the first score.

According to various embodiments, the first model may satisfy $$g(s(i \mid u)) = \frac{1}{1 + \exp(-b_0 - b_1 s(i \mid u))},$$

wherein s(i|u) is the first score, and g(s(i|u)) is the second score.

According to various embodiments, the identifying of the first relevancy and the second relevancy further includes identifying the second score of each item among the first number of items by using the first model, for the second score of each item among the first number of items, identifying the first relevancy and the second relevancy which satisfies $$g(s) = \sum_{a \in F_1} p(rel_i \mid a, s) p(a \mid u, s),$$

wherein g(s) is the second score, $F_1$ is the first feature set, $p(rel_i|a,s)$ is the first relevancy that is a probability by which each element of the first feature set is associated with each item among the first number of items, and $p(a|u,s)$ is the second relevancy that is a probability by which each element of the first feature set is associated with the user.

According to various embodiments, the identifying, for the second score of each item among the first number of items, of the first relevancy and the second relevancy which satisfy the following equation, $$g(s) = \sum_{a \in F_1} p(rel_i | a, s) p(a | u, s)$$

may include setting initial value of at least one of the first relevancy or the second relevancy, and repeatedly identify values of one of the first relevancy and the second relevancy while fixing the other of the first relevancy and the second relevancy.

According to various embodiments, the repeating of the operation of, identifying values of one of the first relevancy and the second relevancy while fixing the other of the first relevancy and the second relevancy may be repeated until at least one of change in the first relevancy or the second relevancy becomes equal to or smaller than a predetermined level.

According to various embodiments, the initial value of at least one of the first relevancy or the second relevancy may be identified at least based on an item selection history of the user.

According to various embodiments, the initial value of at least one of the first relevancy or the second relevancy may be identified based on at least one first score corresponding to at least one item related to each element of the first feature set.

According to various embodiments, the method executed by the electronic device 210 and the server 230 may further include identifying an input by the user for changing at least one of fourth relevancies, identifying a changed value of the at least one of the fourth relevancies, the changed value being identified based on the input by the user, updating the first list to identify a second list of the second number of items based on the changed value of the at least one of the fourth relevancies, and outputting the second list.

According to various embodiments, the input by the user may indicate the changed value of the at least one among the fourth relevancies.

According to various embodiments, the method executed by the electronic device 210 and the server 230 may include transmitting a query to a first external electronic device 220 and 240 through the communication module, receiving a list of items corresponding to the query from the first electronic device 210 and the server 230 through the communication module, identifying at least one element among elements of a feature set associated with the items, and a first relevancy between the at least one element and each of the items, identifying a second relevancy between the at least one element and a user associated with the query, and providing, together with at least some of the items, a reason for recommendation, based on the first relevancies, the second relevancy, and the at least one element.

An electronic device according to various embodiments disclosed herein may be various types of devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with,", it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the invoked at least one instruction. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more components of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display;
    a transceiver; and
    at least one processor configured to:
        receive, from a first external electronic device through the transceiver, a list of a first number of items generated based on a request of a user, and a first score corresponding to each item among the first number of items,
        identify, based at least on the list of the first number of items and the first score, a first relevancy between each element of a first feature set and each item among the first number of items, and a second relevancy between each element of the first feature set and the user,
        identify a first list of a second number of items, the second number of items being smaller than the first number of items,
        identify, for at least one item among the first list, a third relevancy between at least one first feature among the elements of the first feature set which satisfies a designated condition and the at least one item among the first list, and a fourth relevancy between the at least one first feature and the user, based on the first relevancy and the second relevancy,
        determine the third relevancy and the fourth relevancy, together with the first list of the second number of items, and
        display, via the display, the first list, the third relevancy, and the fourth relevancy,
    wherein the first list has a highest score among the first score of the first number of items.

2. The electronic device of claim 1,
    wherein the at least one processor is further configured to:
        identify a first model having the first score as an input and a second score as an output, based on a history of the list of the first number of items identified by the first external electronic device and the first score corresponding to each item among the list of the first number of items included in the history, and
    wherein the first model is a function that monotonically increases with respect to the first score.

3. The electronic device of claim 2,
    wherein the first model satisfies $$g(s(i|u)) = \frac{1}{1+\exp(-b_0 - b_1 s(i|u))},$$

and
    wherein $s(i|u)$ is the first score, and $g(s(i|u))$ is the second score.

4. The electronic device of claim 2,
    wherein the at least one processor is further configured to, in order to identify the first relevancy and the second relevancy:
        identify the second score of each item among of the first number of items by using the first model, and
        for the second score of each item among the first number of items, identify the first relevancy and the second relevancy which satisfy $$g(s) = \sum_{a \in F_1} p(rel_i \mid a, s) p(a \mid u, s),$$

and
    wherein $g(s)$ is the second score, $F_1$ is the first feature set, $p(rel_i|a,s)$ is the first relevancy that is a probability by which each element of the first feature set is associated with each item among the first number of items, and $p(a|u,s)$ is the second relevancy that is a probability by which each element of the first feature set is associated with the user.

5. The electronic device of claim 4, wherein the at least one processor is configured to,
    in order to identify the first relevancy and the second relevancy which satisfy the following equation for the second score of each item among the first number of items:

$$g(s) = \sum_{a \in F_1} p(rel_i \mid a, s) p(a \mid u, s)$$

set an initial value of at least one of the first relevancy or the second relevancy, and
    repeatedly identify a value of one of the first relevancy or the second relevancy while fixing another of the first relevancy or the second relevancy.

6. The electronic device of claim 5, wherein identifying the value of the one of the first relevancy or the second relevancy while fixing the other of the first relevancy or the second relevancy is repeated until a change in at least one of the first relevancy or the second relevancy becomes equal to or smaller than a predetermined level.

7. The electronic device of claim 5, wherein the initial value of the at least one of the first relevancy or the second relevancy is identified based at least on an item selection history of the user.

8. The electronic device of claim 5, wherein the initial value of the at least one of the first relevancy or the second relevancy is identified based on at least one first score corresponding to at least one item related to each element of the first feature set.

9. The electronic device of claim 1, further comprising an input device,
wherein the at least one processor is further configured to:
identify a request of the user for an item list, through the input device,
in response to the request of the user for the item list, request the list of the first number of items and the first score corresponding to each item among the first number of items, through the transceiver to the first external electronic device, and
determine the first list, the third relevancy, and the fourth relevancy by displaying on the display.

10. The electronic device of claim 1,
wherein the electronic device is a server, and
wherein the at least one processor is further configured to:
receive a request of the user for an item list from a second external electronic device through the transceiver,
in response to the request of the user for the item list, request the list of the first number of items and the first score corresponding to each item among the first number of items through the transceiver to the first external electronic device, and
determine the third relevancy and the fourth relevancy together with the first list by transmitting the first list, the third relevancy, and the fourth relevancy to the second external electronic device.

11. The electronic device of claim 1, wherein the at least one processor is further configured to:
identify an input by the user for changing at least one of fourth relevancies,
identify a changed value of the at least one of the fourth relevancies, the changed value being identified based on the input by the user,
based on the changed value of the at least one of the fourth relevancies, update the first list to identify a second list of the second number of items, and
determine the second list.

12. The electronic device of claim 11, wherein the input by the user indicates the changed value of the at least one of the fourth relevancies.

13. A method of an electronic device, the method comprising:
receiving, by a transceiver of the electronic device, a list of a first number of items generated based on a request of a user, and a first score corresponding to each item among the first number of items;
identifying a first relevancy between each element of a first feature set and each item among the first number of items, and a second relevancy between each element of the first feature set and the user, based at least on the list of the first number of items and the first score;
identifying, by a processor of the electronic device, a first list of a second number of items, the second number of items being smaller than the first number of items;
identifying, by the processor of the electronic device, for at least one item among the first list, a third relevancy between at least one first feature among the elements of the first feature set which satisfies a designated condition, and the at least one item among the first list, and a fourth relevancy between the at least one first feature and the user, based on the first relevancy and the second relevancy;
determining the third relevancy and the fourth relevancy, together with the first list; and
displaying the first list, by a display, the third relevancy, and the fourth relevancy,
wherein the first list has a highest score among the first score of the first number of items.

14. The method of claim 13,
wherein the identifying of the first relevancy and the second relevancy comprises:
identifying a first model having the first score as an input and a second score as an output, based on a history of the list of the first number of items identified by a first external electronic device and the first score corresponding to each item among the list of the first number of items included in the history, and
wherein the first model is a function that monotonically increases with respect to the first score.

15. The method of claim 14,
wherein the first model satisfies $$g(s(i\,|\,u)) = \frac{1}{1 + \exp(-b_0 - b_1 s(i\,|\,u))},$$

wherein $s(i|u)$ is the first score, and $g(s(i|u))$ is the second score,
wherein the identifying of the first relevancy and the second relevancy further comprises:
identifying the second score of each item among the first number of items by using the first model, and
for the second score of each item among the first number of items, identifying the first relevancy and the second relevancy which satisfy $$g(s) = \sum_{a \in F_1} p(rel_i\,|\,a, s) p(a\,|\,u, s),$$

and
wherein $g(s)$ is the second score, $F_1$ is the first feature set, $p(rel_i|a,s)$ is the first relevancy that is a probability by which each element of the first feature set is associated with each item among the first number of items, and $p(a|u,s)$ is the second relevancy that is a probability by which each element of the first feature set is associated with the user.

16. The method of claim 15, wherein the identifying, for the second score of each item among the first number of items, of the first relevancy and the second relevancy which satisfy the following equation, $$g(s) = \sum_{a \in F_1} p(rel_i\,|\,a, s) p(a\,|\,u, s)$$

comprises:
setting an initial value of at least one of the first relevancy or the second relevancy, and
repeatedly identify values of one of the first relevancy or the second relevancy while fixing another of the first relevancy or the second relevancy until at least one of change in the first relevancy or the second relevancy becomes equal to or smaller than a predetermined level.

17. The method of claim 13, further comprising:

identifying an input by the user for changing at least one of fourth relevancies;

identifying a changed value of the at least one of the fourth relevancies, the changed value being identified based on the input by the user;

based on the changed value of the at least one of the fourth relevancies, updating the first list to identify a second list of the second number of items; and determining the second list.

* * * * *